US012634084B2

(12) United States Patent
Ko et al.

(10) Patent No.: US 12,634,084 B2
(45) Date of Patent: May 19, 2026

(54) METHOD AND APPARATUS FOR PERFORMING WIRELESS COMMUNICATION RELATED TO SL PRS IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 18/304,752

(22) Filed: Apr. 21, 2023

(65) Prior Publication Data

US 2023/0344595 A1 Oct. 26, 2023

Related U.S. Application Data

(60) Provisional application No. 63/333,517, filed on Apr. 21, 2022.

(30) Foreign Application Priority Data

Apr. 10, 2023 (KR) ........................ 10-2023-0047074

(51) Int. Cl.
*H04L 5/00* (2006.01)
*H04W 72/0446* (2023.01)
(Continued)

(52) U.S. Cl.
CPC ....... *H04L 5/0051* (2013.01); *H04W 72/0446* (2013.01); *H04W 72/0453* (2013.01); *H04W 72/25* (2023.01)

(58) Field of Classification Search
CPC ..... H04L 5/0051; H04L 5/001; H04L 5/0053; H04L 5/0094; H04L 5/005; H04W 72/0446; H04W 72/0453; H04W 72/25
See application file for complete search history.

(56) References Cited

U.S. PATENT DOCUMENTS

2022/0077990 A1 3/2022 Bao et al.
2023/0309152 A1* 9/2023 Si ...................... H04W 74/0816
(Continued)

FOREIGN PATENT DOCUMENTS

WO 2020-256311 12/2020

OTHER PUBLICATIONS

Korean Intellectual Property Office Application No. 10-2023-0047074, Office Action dated May 26, 2025, 5 pages.
(Continued)

*Primary Examiner* — Brian T O Connor
(74) *Attorney, Agent, or Firm* — LEE, HONG, DEGERMAN, KANG & WAIMEY

(57) ABSTRACT

A method for performing wireless communication by a first apparatus and an apparatus supporting the method are proposed. For example, the first apparatus may obtain configuration information related to an SL PRS. For example, the configuration information related to the SL PRS may include at least one of information related to a transmission resource set for transmission of the SL PRS or information related to a reception resource set for reception of the SL PRS. For example, the first apparatus may receive control information related to the SL PRS from a second apparatus through an SL PRS CCH related to the SL PRS. For example, the first apparatus may receive the SL PRS from the second apparatus. For example, the control information related to the SL PRS may include at least one of index information of a BWP or index information of a resource pool.

18 Claims, 24 Drawing Sheets

(51) Int. Cl.
  H04W 72/0453    (2023.01)
  H04W 72/25    (2023.01)

(56) References Cited

U.S. PATENT DOCUMENTS

| 2024/0323899 | A1* | 9/2024 | Liu | G01S 5/0072 |
| 2024/0413944 | A1* | 12/2024 | Lei | H04L 5/0094 |
| 2025/0008500 | A1* | 1/2025 | Manolakos | H04W 72/0457 |
| 2025/0056612 | A1* | 2/2025 | Su | H04W 74/0816 |
| 2025/0168804 | A1* | 5/2025 | Manolakos | H04W 64/00 |

OTHER PUBLICATIONS

ZTE et al., "Evolution of NR positioning in Rel-18," RP-212381, 3GPP TSG RAN Meeting #93-e, Electronic Meeting, Sep. 2021, 13 pages.

* cited by examiner (a)                          (b)

Figure 22:
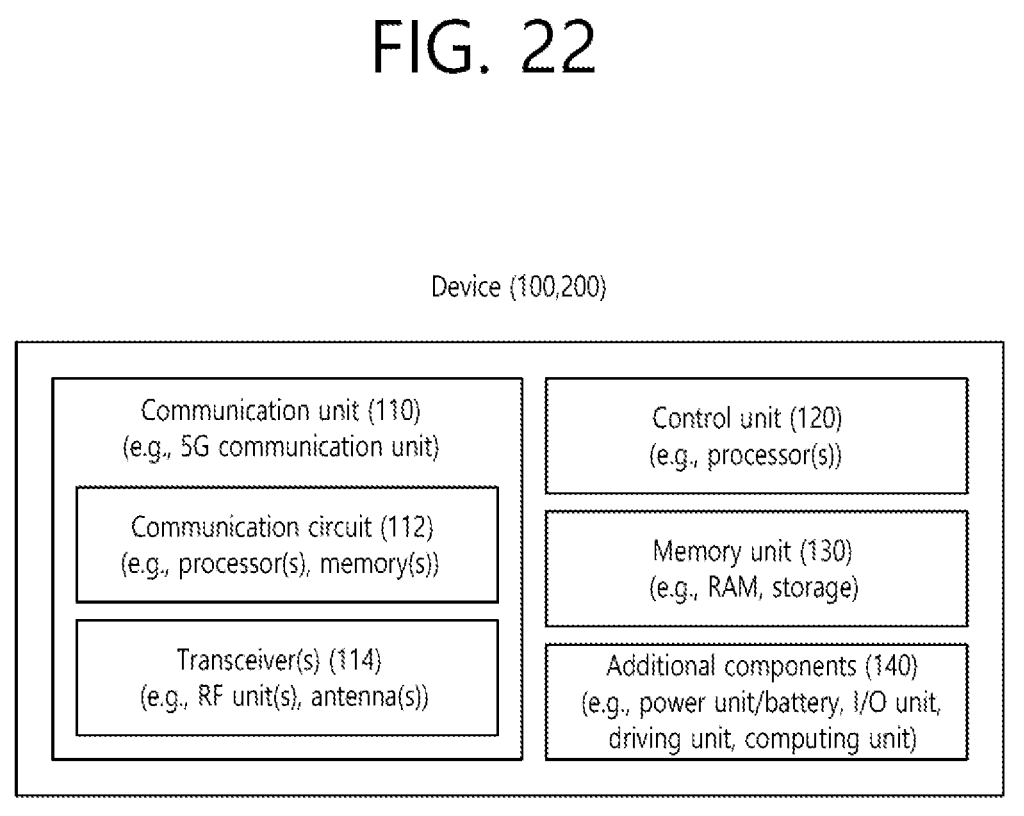

Device (100,200)

| Communication unit (110) (e.g., 5G communication unit) | Control unit (120) (e.g., processor(s)) |
|---|---|
| Communication circuit (112) (e.g., processor(s), memory(s)) | Memory unit (130) (e.g., RAM, storage) |
| Transceiver(s) (114) (e.g., RF unit(s), antenna(s)) | Additional components (140) (e.g., power unit/battery, I/O unit, driving unit, computing unit) |

FIG. 24

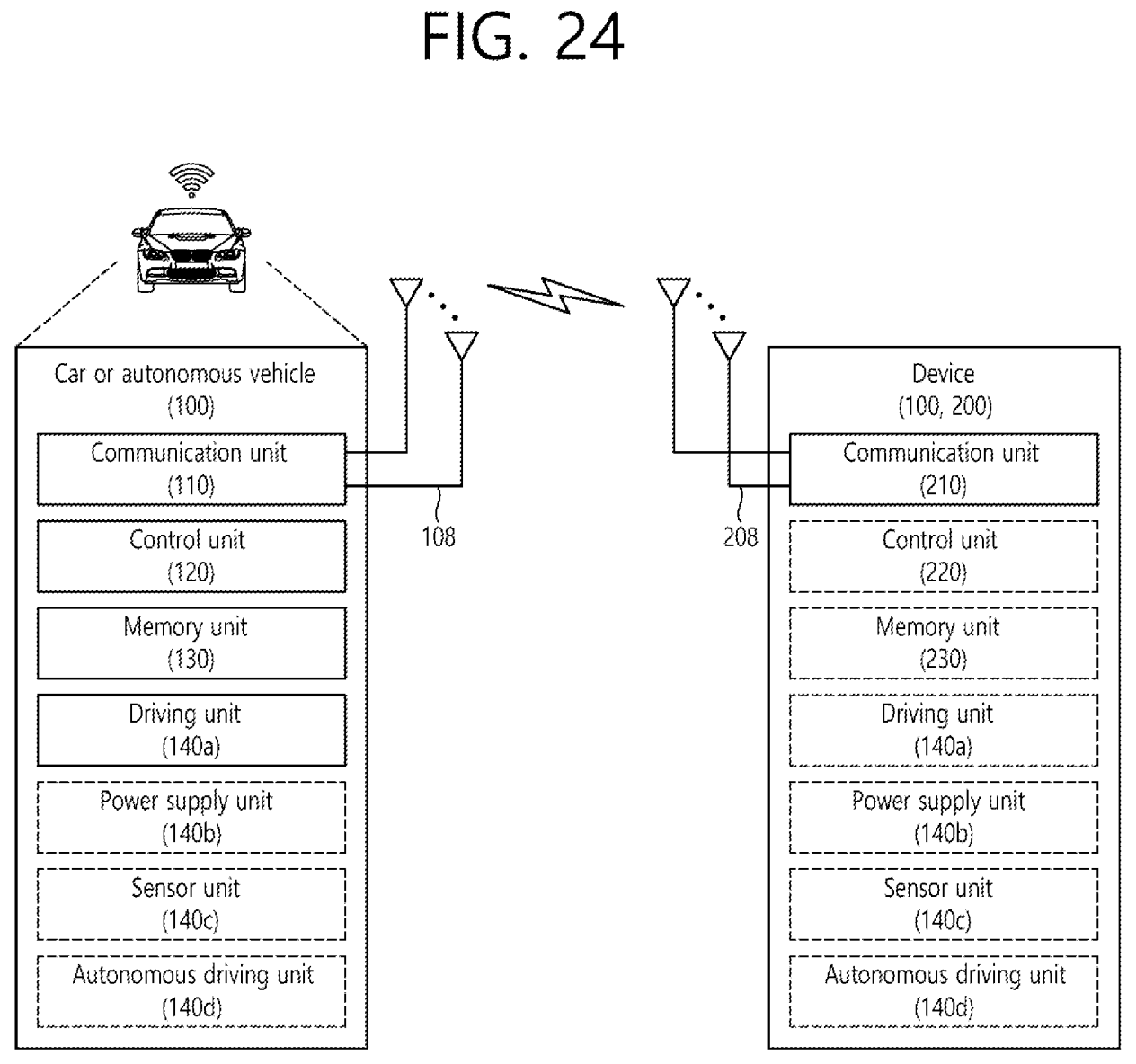

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

108

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

METHOD AND APPARATUS FOR PERFORMING WIRELESS COMMUNICATION RELATED TO SL PRS IN NR V2X

CROSS-REFERENCE TO RELATED APPLICATIONS

Pursuant to 35 U.S.C. § 119, this application claims the benefit of U.S. Provisional Application No. 63/333,517, filed on Apr. 21, 2022, and also claims the benefit of earlier filing date and right of priority to Korean Application No. 10-2023-0047074, filed on Apr. 10, 2023, the contents of which are all hereby incorporated by reference herein in their entirety.

BACKGROUND

Field

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an entity having an infrastructure (or infra) established therein, and so on. The V2X may be spread into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, for example, a UE receiving an SL PRS may detect information related to an SL PRS resource to search for SL PRS resources. For example, a UE receiving an SL PRS may perform blind detection on the information related to an SL PRS resource. However, for example, the blind detection may be performed inefficiently. Also, for example, in a relationship with a UE that reserves or uses an SL PRS resource, the UE may have to find information related to the SL PRS resource based on sensing. Therefore, an SL PRS control channel (CCH) through which SL PRS control information related to the SL PRS is transmitted may have to be defined.

In one embodiment, a method for performing wireless communication by a first apparatus is provided. For example, the first apparatus may obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the first apparatus may receive control information related to the SL PRS from a second apparatus through an SL PRS control channel (CCH) related to the SL PRS. For example, the first apparatus may receive the SL PRS from the second apparatus. For example, the control information related to the SL PRS may include at least one of index information of a bandwidth part (BWP) or index information of a resource pool.

In one embodiment, a first apparatus for performing wireless communication is provided. The first apparatus comprises one or more memories storing instructions; one or more transceivers; and one or more processors connected to the one or more memories and the one or more transceivers, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the one or more processors may execute the instructions to receive control information related to the SL PRS from a second apparatus through an SL PRS control channel (CCH) related to the SL PRS. For example, the one or more processors may execute the instructions to receive the SL PRS from the second apparatus. For example, the control information related to the SL PRS may include at least one of index information of a bandwidth part (BWP) or index information of a resource pool.

In one embodiment, an apparatus configured to control a first UE is provided. The apparatus comprises one or more processors; and one or more memories operably connected to the one or more processors and storing instructions, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, control information related to the SL PRS may be received from a second UE through an SL PRS control channel (CCH) related to the SL PRS. For example, the one or more processors may execute the instructions to receive the SL PRS from the second UE. For example, the control information related to the SL PRS may include at least one of index information of a bandwidth part (BWP) or index information of a resource pool.

In one embodiment, a non-transitory computer-readable storage medium having instructions thereon is proposed. The instructions, when executed by one or more processors, may cause the one or more processors to obtain configuration information related to a sidelink (SL) positioning reference signal (PRS) by a first apparatus. For example, the configuration information related to the SL PRS may include at least one of information related to a transmission resource set for transmission of the SL PRS or information related to a reception resource set for reception of the SL PRS. For example, the instructions, when executed by one or more processors, may control the one or more processors to receive control information related to the SL PRS from a second apparatus through an SL PRS control channel (CCH) related to the SL PRS by the first apparatus. For example, the instructions, when executed by one or more processors, may control the one or more processors to receive the SL PRS from the second apparatus by the first apparatus. For example, the control information related to the SL PRS may include at least one of index information of a bandwidth part (BWP) or index information of a resource pool.

In one embodiment, a method for performing wireless communication by a second apparatus is provided. For example, the second apparatus may obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the second apparatus may transmit control information related to the SL PRS from a first apparatus through an SL PRS control channel (CCH) related to the SL PRS. For example, the second apparatus may transmit the SL PRS to the first apparatus. For example, the control information related to the SL PRS may include at least one of index information of a bandwidth part (BWP) or index information of a resource pool.

In one embodiment, a second apparatus for performing wireless communication is provided. The second apparatus comprises one or more memories storing instructions; one or more transceivers; and one or more processors connected to the one or more memories and the one or more transceivers, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the one or more processors may execute the instructions to transmit control information related to the SL PRS to a first apparatus through an SL PRS control channel (CCH) related to the SL PRS. For example, the one or more processors may execute the instructions to transmit the SL PRS to the first apparatus. For example, the control information related to the SL PRS may include at least one of index information of a bandwidth part (BWP) or index information of a resource pool.

In one embodiment, an apparatus configured to control a second UE is provided. The apparatus comprises one or more processors; and one or more memories operably connected to the one or more processors and storing instructions, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the one or more processors may execute the instructions to transmit control information related to the SL PRS to a first UE through an SL PRS control channel (CCH) related to the SL PRS. For example, the one or more processors may execute the instructions to transmit the SL PRS to the first UE. For example, the control information related to the SL PRS may include at least one of index information of a bandwidth part (BWP) or index information of a resource pool.

In one embodiment, a non-transitory computer-readable storage medium having instructions thereon is proposed. The instructions, when executed by one or more processors, may cause the one or more processors to obtain configuration information related to a sidelink (SL) positioning reference signal (PRS) by a second apparatus. For example, the configuration information related to the SL PRS may include at least one of information related to a transmission resource set for transmission of the SL PRS or information related to a reception resource set for reception of the SL PRS. For example, the instructions, when executed by one or more processors, may control the one or more processors to transmit control information related to the SL PRS to a first apparatus through an SL PRS control channel (CCH) related to the SL PRS by the second apparatus. For example, the instructions, when executed by one or more processors, may control the one or more processors to transmit the SL PRS to the apparatus by the second apparatus. For example, the control information related to the SL PRS may include at least one of index information of a bandwidth part (BWP) or index information of a resource pool.

A UE can efficiently perform sidelink communication.

BRIEF DESCRIPTION OF THE DRAWINGS

FIG. 9 shows an example of an architecture of a 5G system capable of positioning a UE having access to a next generation-radio access network (NG-RAN) or an E-UTRAN based on an embodiment of the present disclosure.

FIG. 22 shows another example of a wireless device, based on an embodiment of the present disclosure.

FIG. 24 shows a vehicle or an autonomous vehicle, based on an embodiment of the present disclosure.

DESCRIPTION OF EXEMPLARY EMBODIMENTS

Figure 1:
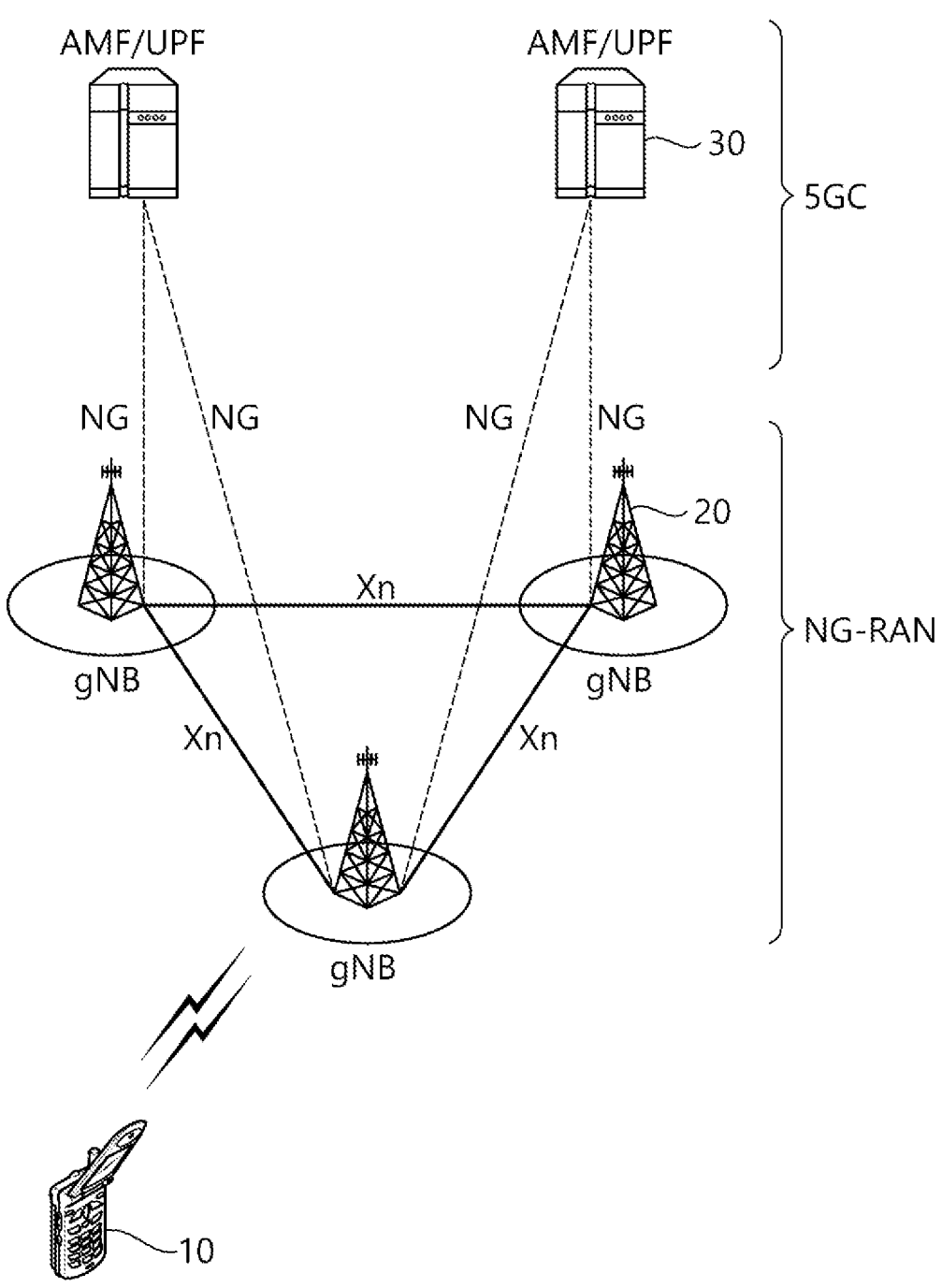
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or predefined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system inter-connection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
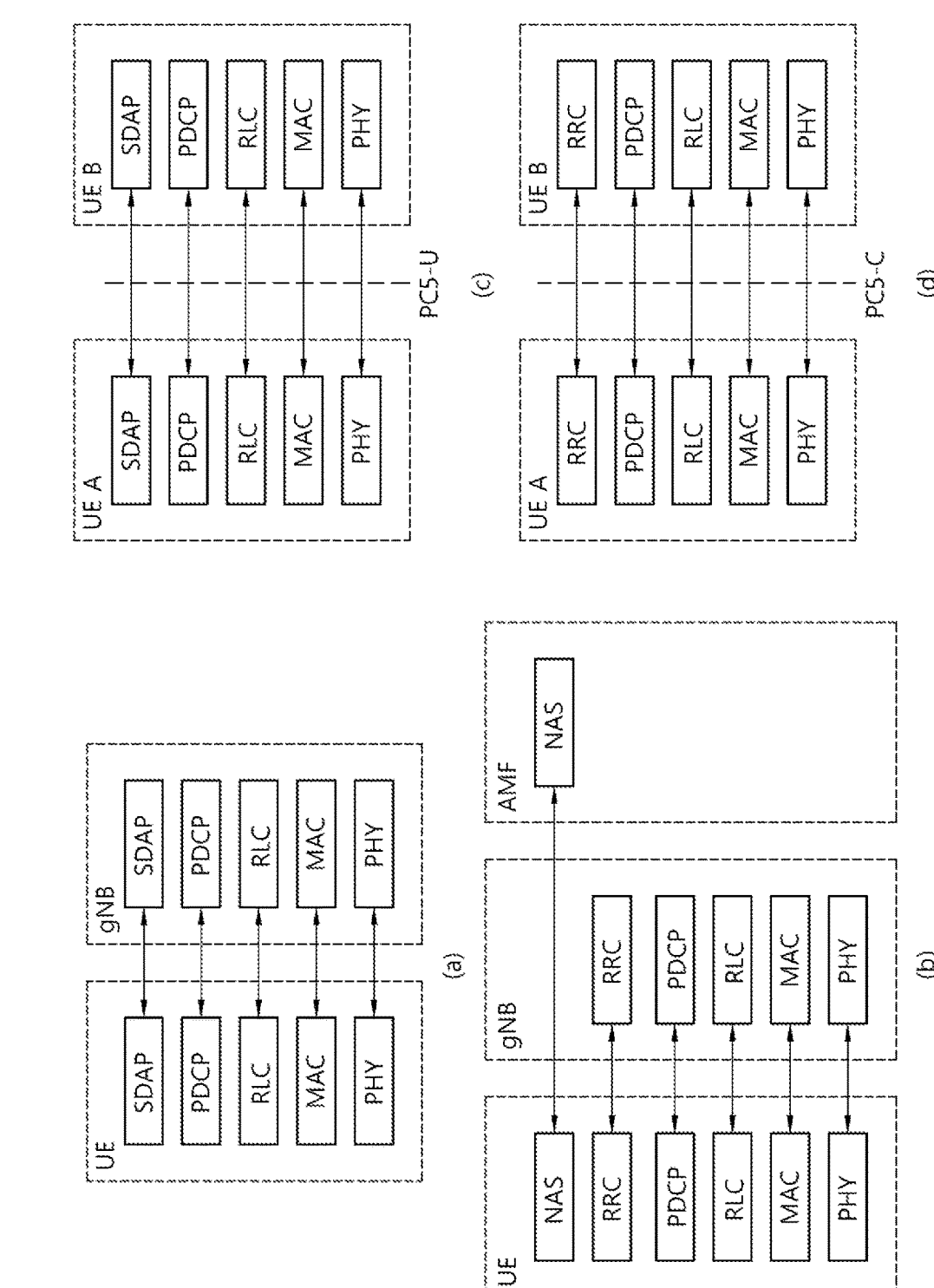
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC CONNECTED state, and, otherwise, the UE may be in an RRC IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
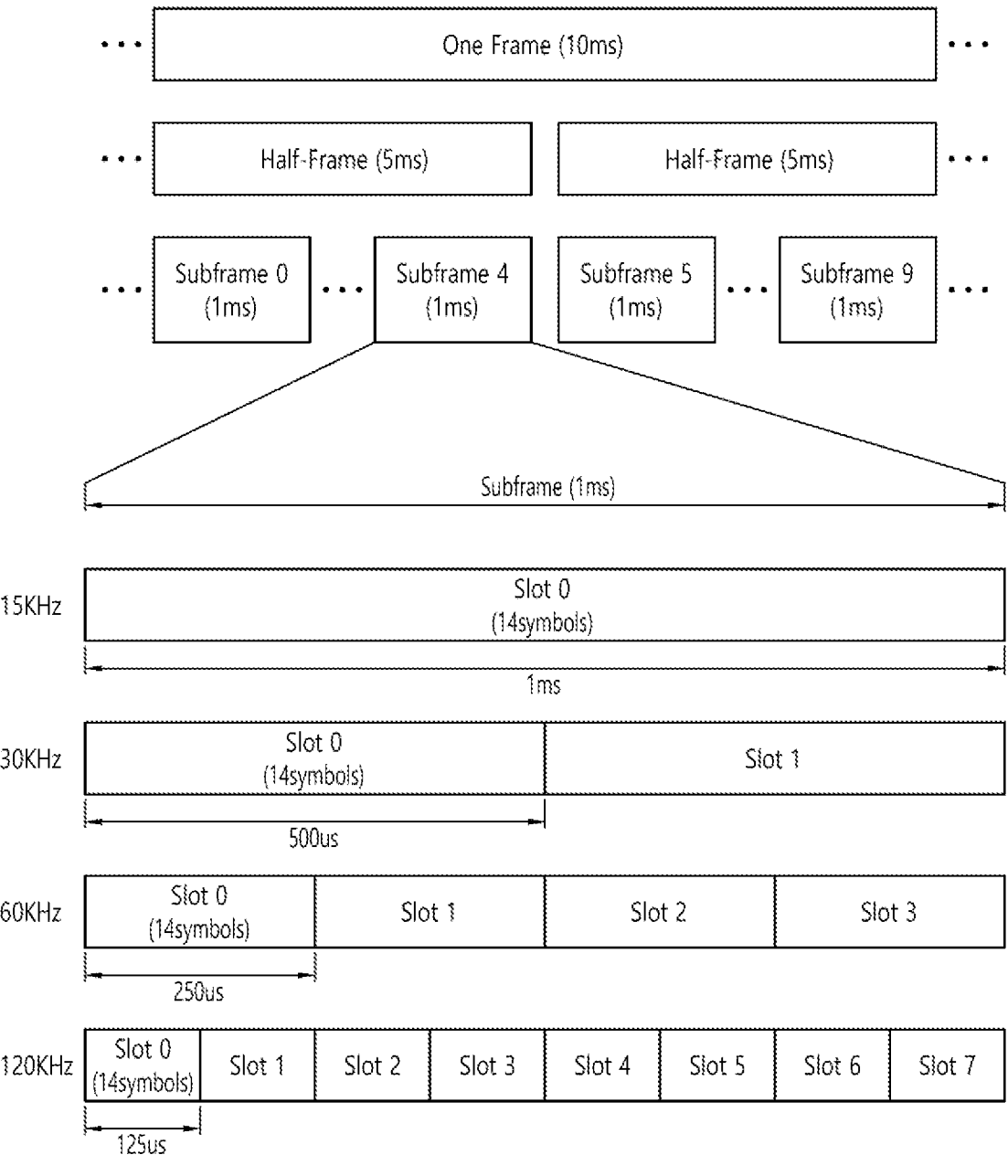
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot $$\left(N_{symb}^{slot}\right),$$

a number slots per frame $$\left(N_{slot}^{frame,u}\right),$$

and a number of slots per subframe $$\left(N_{slot}^{subframe,u}\right)$$

based on an SCS configuration (u), in a case where a normal CP is used.

TABLE 1

| SCS ($15*2^u$) | $N_{symb}^{slot}$ | $N_{slot}^{frame,\,u}$ | $N_{slot}^{subframe,\,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N_{symb}^{slot}$ | $N_{slot}^{frame,\,u}$ | $N_{slot}^{subframe,\,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz–7125 MHz | 15, 30, 60 kHz |
| FR2 | 24250 MHz–52600 MHz | 60, 120, 240 kHz |

Figure 4:
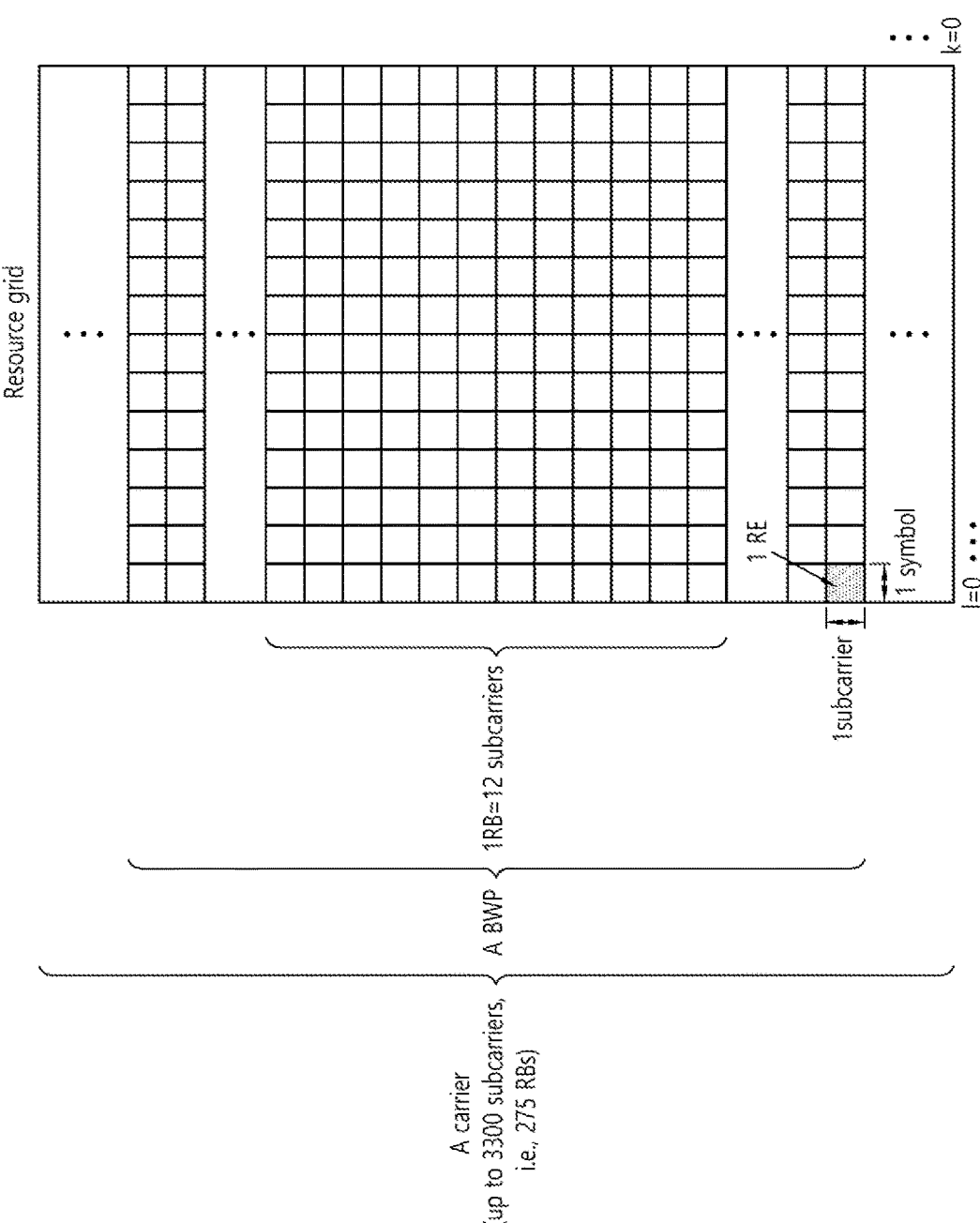
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC IDLE UE. For the UE in the RRC CONNECTED mode, at least one SL BWP may be activated in the carrier.

Figure 5:
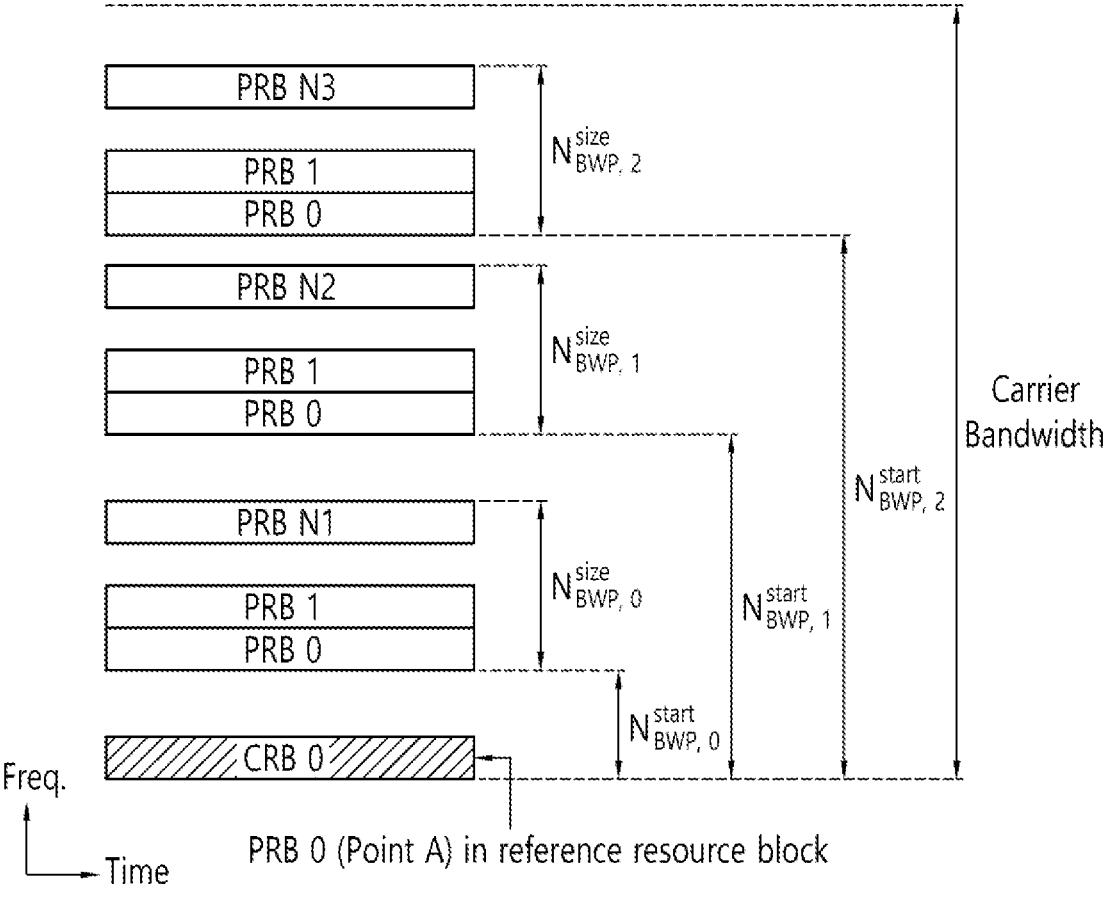
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $$N_{BWP}^{start}$$

from the point A, and a bandwidth $$N_{BWP}^{size}.$$

For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
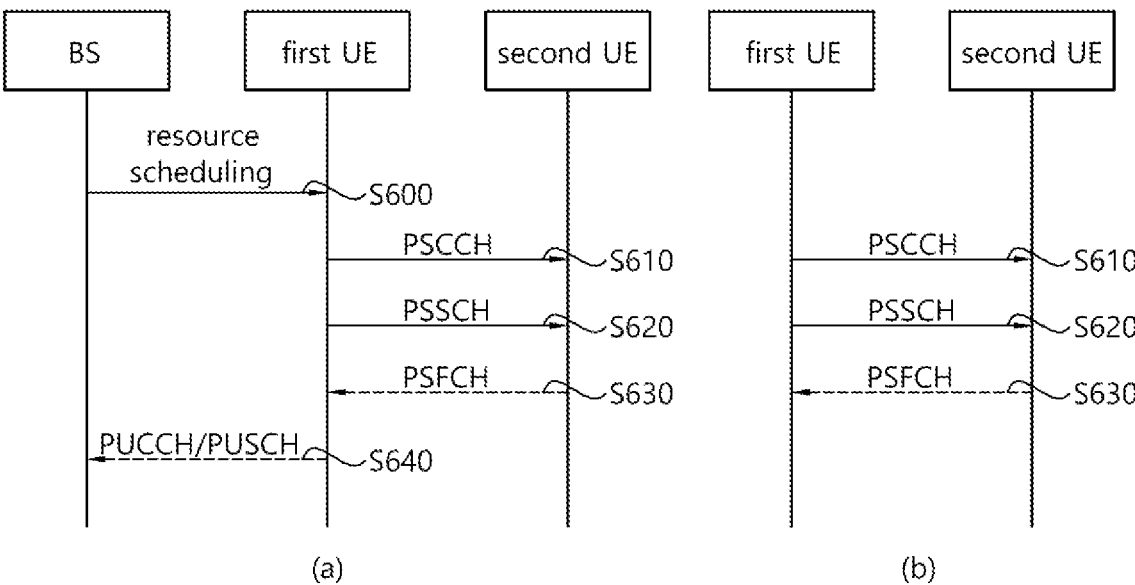
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—ceiling (log$_2$I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits

New data indicator—1 bit

Lowest index of the subchannel allocation to the initial transmission—ceiling $$\left(\log_2\left(N_{subChannel}^{SL}\right)\right)$$

bits

SCI format 1-A fields: frequency resource assignment, time resource assignment

PSFCH-to-HARQ feedback timing indicator—ceiling (log$_2$N$_{fb\_timing}$) bits, where N$_{fb\_timing}$ is the number of entries in the higher layer parameter sl-PSFCH-To-PUCCH.

PUCCH resource indicator—3 bits

Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment –

$$\text{ceiling}\left(\log_2\left(N_{subChannel}^{SL}\left(N_{subChannel}^{SL}+1\right)/2\right)\right)$$

bits when the value of the higher layer parameter sl-MaxNumPerReserve is configured to 2; otherwise ceiling log$_2$ $$\left(N_{subChannel}^{SL}\left(N_{subChannel}^{SL}+1\right)\left(2N_{subChannel}^{SL}+1\right)/6\right)$$

bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rv\_period})$ bits, where $N_{rv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList 2nd-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

TABLE 6

| Value of the Number of DMRS port field | Antenna ports |
| --- | --- |
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
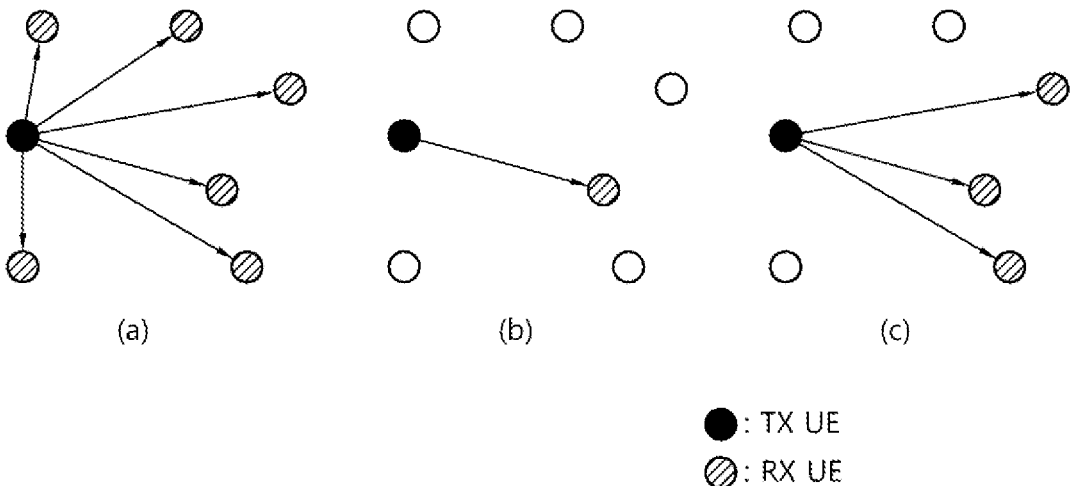
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Hereinafter, UE procedure for determining the subset of resources to be reported to higher layers in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $\text{prio}_{TX}$;

the remaining packet delay budget;

the number of sub-channels to be used for the PSSCH/PSCCH transmission in a slot, $L_{subCH}$;

optionally, the resource reservation interval, $P_{rsv\_TX}$, in units of msec if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $$(r'_0, r'_1, r'_2, \ldots)$$

which may be subject to pre-emption.

it is up to UE implementation to determine the subset of resources as requested by higher layers before or after the slot $$r''_i - T_3,$$

where $$r''_i$$

is the slot with the smallest slot index among $$(r_0, r_1, r_2, \ldots) \text{ and } (r'_0, r'_1, r'_2, \ldots),$$

and $T_3$ is equal to $$T^{SL}_{proc,1},$$

where $$T^{SL}_{proc,1}$$

is the number of slots determined based on the SCS configuration of the SL BWP.

The following higher layer parameters affect this procedure:

sl-SelectionWindowList: internal parameter T2 min is set to the corresponding value from higher layer parameter sl-SelectionWindowList for the given value of $\text{prio}_{TX}$.

sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $P_j = \text{prio}_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec.

sl-TxPercentageList: internal parameter X for a given $\text{prio}_{TX}$ is defined as sl-TxPercentageList ($\text{prio}_{TX}$) converted from percentage to ratio.

sl-PreemptionEnable: if sl-PreemptionEnable is provided, and if it is not equal to 'enabled', internal parameter $\text{prio}_{pre}$ is set to the higher layer provided parameter sl-PreemptionEnable.

The resource reservation interval, $P_{rsvp\_TX}$, if provided, is converted from units of msec to units of logical slots, resulting in $$P'_{rsvp\_TX}.$$

Notation:

$$(t_0^{\prime SL}, t_1^{\prime SL}, t_2^{\prime SL}, \ldots)$$

denotes the set of slots which belongs to the sidelink resource pool.

For example, the UE may select a set of candidate resources ($S_A$) based on Table 8. For example, if resource (re)selection is triggered, the UE may select a set of candidate resources ($S_A$) based on Table 11. For example, if re-evaluation or pre-emption is triggered, the UE may select a set of candidate resources ($S_A$) based on Table 8.

TABLE 8

The following steps are used:

1) A candidate single-slot resource for transmission $R_{x,y}$ is defined as a set of $L_{subCH}$ contiguous sub-channels with sub-channel x I j in slot $t_y^{\prime SL}$ where j = 0, . . . , $L_{subCH}$ − 1. The UE shall assume that any set of $L_{subCH}$ contiguous sub-channels included in the corresponding resource pool within the time interval [n + $T_1$, n + $T_2$] correspond to one candidate single-slot resource, where selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

The total number of candidate single-slot resources is denoted by $M_{total}$.

2) The sensing window is defined by the range of slots $\lfloor n - T_0, n - T_{proc,0}^{SL})$ where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter $Th(p_i, p_j)$ is set to the corresponding value of RSRP threshold indicated by the i-th field in sl-Thres-RSRP-List, where $i = p_i + (p_j − 1) * 8$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m^{\prime SL}$ in Step 2.

for any periodicity value allowed by the higher layer parameter sl-ResourceReservePeriodList and a hypothetical SCI format 1-A received in slot $t_m^{\prime SL}$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than X · $M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:

a) the UE receives an SCI format 1-A in slot $t_m^{\prime SL}$, and 'Resource reservation period' field, if present, and 'Priority' field in the received SCI format 1-A indicate the values $P_{rsvp\_RX}$ and $prio_{RX}$, respectively;

b) the RSRP measurement performed. for the received SCI format 1-A, is higher than $Th(prio_{RX}, prio_{TX})$;

c) the SCI format received in slot $t_m^{\prime SL}$ or the same SCI format which, if and only if the 'Resource reservation period' field is present in the received SCI format 1-A. is assumed to be received in slot(s) $t_{m+q \times P'_{rsvp\_RX}}^{\prime SL}$ determines the set of resource blocks and slots which overlaps with $R_{x,y+j \times P'_{rsvp\ TX}}$ for q = 1, 2, . . . , Q and j − 0, 1, . . . , $C_{reset} − 1$. Here, $P'_{rsvp\_RX}$ is $P_{rsvp\_RX}$ converted to units of logical slots.

$$Q = \left\lceil \frac{T_{scal}}{P_{rsvp\_RX}} \right\rceil$$

if $P_{rsvp\_RX} < T_{scal}$ and n′ − m ≤ $P'_{rsvp\_RX}$, where $t_{n'}^{\prime SL} = n$ if slot n belongs to the set $(t_0^{\prime SL}, t_1^{\prime SL}, \ldots, t_{T_{max}-1}^{\prime SL})$, otherwise slot $t_{n'}^{\prime SL}$ is the first slot after slot n belonging to the set $(t_0^{\prime SL}, t_1^{\prime SL}, \ldots, t_{T_{max}-1}^{\prime SL})$; otherwise Q = 1. $T_{scal}$ is set to selection window size $T_2$ converted to units of msec.

7) If the number of candidate single-slot resources remaining in the set $S_A$ is smaller than X · $M_{total}$, then $Th(p_i, p_j)$ is increased by 3 dB for each priority value $Th(p_i, p_j)$ and the procedure continues with step 4.

The UE shall report set $S_A$ to higher layers.

If a resource $r_i$ from the set $(j_0, r_1, r_2, \ldots)$ is not a member of $S_A$, then the UE shall report re-evaluation of the resource $r_i$ to higher layers.

If a resource $r_i'$ from the set $(r_0', r_1', r_2', \ldots)$ meets the conditions below then the UE shall report pre-emption of the resource $r_i'$ to higher layers $r_i'$ is not a member of $S_A$, and $r_i'$ meets the conditions for exclusion in step 6, with $Th(prio_{RX}, prio_{TX})$ set to the final threshold after executing steps 1)-7). i.e. including all necessary increments for reaching X · $M_{total}$, and the associated priority $prio_{RX}$, satisfies one of the following conditions:

sl-PreemptionEnable is provided and is equal to 'enabled' and $prio_{TX} > prio_{RX}$ sl-PreemptionEnable is provided and is not equal to 'enabled', and $prio_{RX} < prio_{pre}$ and $prio_{TX} > prio_{RX}$ Meanwhile, partial sensing may be supported for power saving of the UE. For example, in LTE SL or LTE V2X, the UE may perform partial sensing based on Tables 9 and 10.

TABLE 9

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe. $P_{rsvp\_TX}$ the resource reservation interval, and $prio_{TX}$ the priority to be transmitted in the associated SCI format 1 by the UE are all provided by higher layers.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers. $C_{resel}$ is determined by $C_{resel} = 10*SL\_RESOURCE\_RESELECTION\_COUNTER$, where SL_RESOURCE_RESELECTION_COUNTER is provided by higher layers.

. . .

If partial sensing is configured by higher layers then the following steps are used:

1) A candidate single-subframe resource for PSSCH transmission $R_{x,y}$ is defined as a set of $L_{subCH}$ contiguous sub-channels with sub-channel $x - j$ in subframe $t_y^{SL}$ where $j = 0, \ldots, L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \leq 4$ and $T_{2min}$ ($prio_{TX}$) $\leq T_2 \leq 100$, if $T_{2min}$ ($prio_{TX}$) is provided by higher layers for $prio_{TX}$, otherwise $20 \leq T_2 < 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $T_{y\ kxP_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where $i = (a - 1) * 8 + b$.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\ RX}$ and $prio_{RX}$, respectively.
   PSSCH-RSRP measurement according to the received SCI format 1 is higher than $Th_{prio_{TX},prio_{RX}}$.
   the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \cdot P'_{rsvp\_TX}}$ for $q = 1, 2, \ldots, Q$ and $j = 0, 1, \ldots, C_{resel} - 1$. Here, $$Q = \frac{1}{P_{rsvp\_RX}}$$

if $P_{rsvp\_RX} < 1$ and $y' - m \leq P_{step} \times P_{rsvp\_RX} + P_{step}$, where $t_{y'}^{SL}$ is the last subframe of the Y subframes, and $Q = 1$ otherwise.

6) If the number of candidate single-subframe resources remaining in the set $S_A$ is smaller than $0.2 \cdot M_{total}$, then Step 4 is repeated with $Th_{a,b}$ increased by 3 dB.

TABLE 10

7) For a candidate single-subframe resource $R_{x,y}$ remaining in the set $S_A$, the metric $E_{x,y}$ is defined as the linear average of S-RSSI measured in sub-channels x+k for $k = 0, \ldots, L_{subCH} - 1$ in the monitored subframes in Step 2 that can be expressed by $t_{y-P_{step}*f}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where $j = 0, \ldots, L_{subCH} - 1$. The UE shall assume that any set of $L_{subCH}$ contiguous sub-channels included in the corresponding PSSCH resource pool (described in 14.1.5)

TABLE 10-continued within the time interval [n + T$_1$, n + T$_2$] corresponds to one candidate single-subframe resource, where selections of T$_1$, and T$_2$ are up to UE implementations under T$_1$ ≤ 4 and TTX$_{2_{min}}$, if TTX$_{2min}$ is provided by higher layers for prio$_{TX}$, otherwise 20 ≤ T$_2$ ≤ 100. UE selection of T$_2$ shall fulfil the latency requirement. The total number of the candidate single-subframe resources is denoted by M$_{total}$.
2)  The set S$_A$ is initialized to the union of all the candidate single-subframe resources. The set S$_B$ is initialized to an empty set.
3)  The UE moves the candidate single-subframe resource R$_{x,y}$, from the sct S$_A$ to S$_B$.
4)  The UE shall exclude a candidate single-subframe resource R$_{x,y}$ from S$_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].
The UE shall report set S$_B$ to higher layers.

Meanwhile, the conventional candidate resource selection method has a problem of performance (or capability) degradation, which is caused by applying only random selection for a first packet of periodic transmission.

Meanwhile, when a UE performs partial sensing, the UE needs to determine a range of partial sensing (e.g., range/number of slots being the target (or object) of partial sensing). For example, when the partial sensing range is not defined, the UE may perform monitoring during a relatively long time period (or time duration), and this may cause unnecessary power consumption of the UE. For example, when the partial sensing range is not defined, the UE may perform monitoring during a relatively short time period (or time duration). In this case, the UE may not determine resource conflict (or resource collision) with another UE, and, due to such resource conflict, reliability in SL transmission may not be ensured. In the present disclosure, partial sensing may include periodic-based partial sensing (PPS) or continuous partial sensing (CPS). In the present disclosure, PPS may also be referred to as PBPS.

According to various embodiments of the present disclosure, proposed herein are a method for selectively applying random selection and CPS based resource selection for the first packet of a periodic transmission and an apparatus supporting the same. According to various embodiments of the present disclosure, proposed herein are an SL transmission resource selection method and an apparatus supporting the same that can minimize power consumption of the UE, when the UE is operating based on partial sensing.

For example, in various embodiments of the present disclosure, when performing sensing for resource selection, based on a number of cycle periods corresponding to a specific configuration value, periodic-based partial sensing (PPS) may mean an operation performing sensing at time points corresponding to an integer multiple (k) of each cycle period. For example, the cycle periods may be cycle periods of transmission resource configured in a resource pool. For example, PPS may sense resource of a time point temporally preceding a time point of a candidate resource, which is to be a target that determines resource conflict, as much as the integer multiple k value of each cycle period. For example, the k value may be configured to have a bitmap format.

it is assumed that a resource reservation cycle period that is allowed for a resource pool or a resource reservation cycle period that is configured for PPS are P1 and P2, respectively. Furthermore, it is assumed that a UE performs partial sensing (i.e., PPS) for selecting SL resource within slot #Y1.

a UE may perform sensing for a slot that precedes slot #Y1 (or that is located before slot #Y1) by P1 and a slot that precedes slot #Y1 by P2.

a UE may perform sensing for a slot that precedes slot #Y1 (or that is located before slot #Y1) by P1 and a slot that precedes slot #Y1 by P2. Furthermore, optionally, the UE may perform sensing for a slot that precedes slot #Y1 by A*P1 and a slot that precedes slot #Y1 by B*P2. For example, A and B may be positive integers that are equal to or greater than 2. More specifically, for example, a UE that has selected slot #Y1 as a candidate slot may perform sensing for slot #(Y1-resource reservation cycle period*k), and k may be a bitmap. For example, when k is equal to 10001, a UE that has selected slot #Y1 as a candidate slot may perform sensing for slot #(Y1-P1*1), slot #(Y1-P1*5), slot #(Y1-P2*1), and slot #(Y1-P2*5).

For example, in various embodiments of the present disclosure, continuous partial sensing (CPS) may mean an operation performing sensing for all or part of a time domain that is given as a specific configuration value. For example, CPS may include a short-term sensing operation that performs sensing during a relatively short time period (or time duration).

it is assumed that Y number of candidate slots that are selected by a UE are slot #M, slot #(M+T1), and slot #(M+T1+T2). In this case, the slot(s) for which the UE should perform sensing may be determined based on a first slot (i.e., slot #M) among the Y number of candidate slots. For example, after determining the first slot among the Y number of candidate slots as a reference slot, the UE may perform sensing for N number of slots (preceding) from the reference slot.

based on the first slot (i.e., slot #M) among the Y number of candidate slots, the UE may perform sensing on N number of slots. For example, the UE may perform sensing for N number of slots preceding slot #M, and the UE may select at least one SL resource from within the Y number of candidate slots (i.e., slot #M, slot #(M+T1), and slot #(M+T1+T2)), based on the sensing result. For example, N may be configured for the UE or may be pre-configured. For example, among the N number of slots, a time gap for processing may exist between the last slot and slot #M.

Hereinafter, synchronization acquisition of a SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 8:
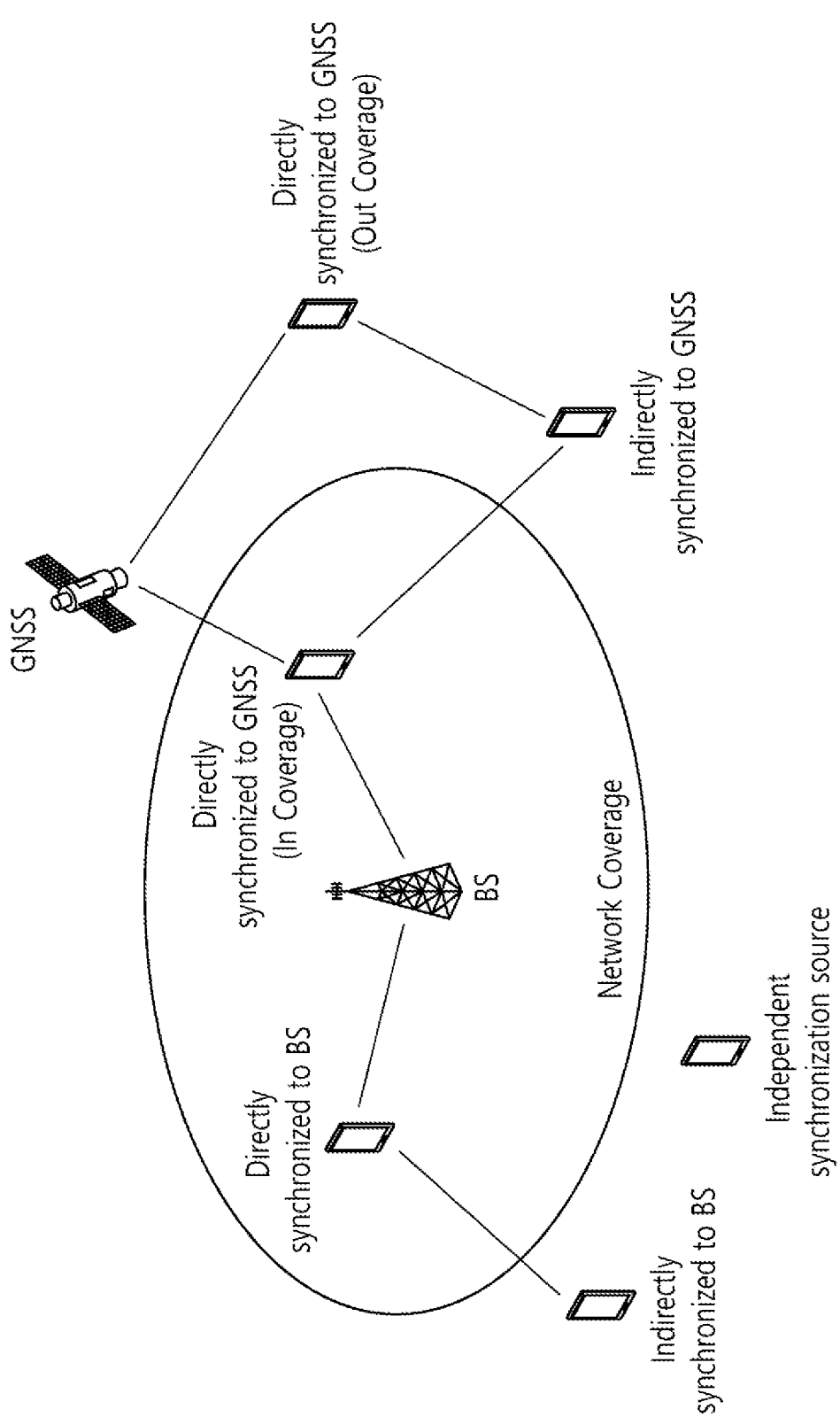
FIG. 8 shows a synchronization source or synchronization reference of V2X, based on an embodiment of the present disclosure.

FIG. 8 shows a synchronization source or synchronization reference of V2X, based on an embodiment of the present disclosure. The embodiment of FIG. 8 may be combined with various embodiments of the present disclosure.

Referring to FIG. 8, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the

TABLE 11

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 12

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 11 or Table 12. Table 11 or Table 12 are for exemplary purposes only, and the relation between the synchronization source and the synchronization priority may be defined in various forms.

In Table 11 or Table 12, P0 may denote a highest priority, and P6 may denote a lowest priority. In Table 11 or Table 12, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Hereinafter, positioning will be described.

Figure 9:
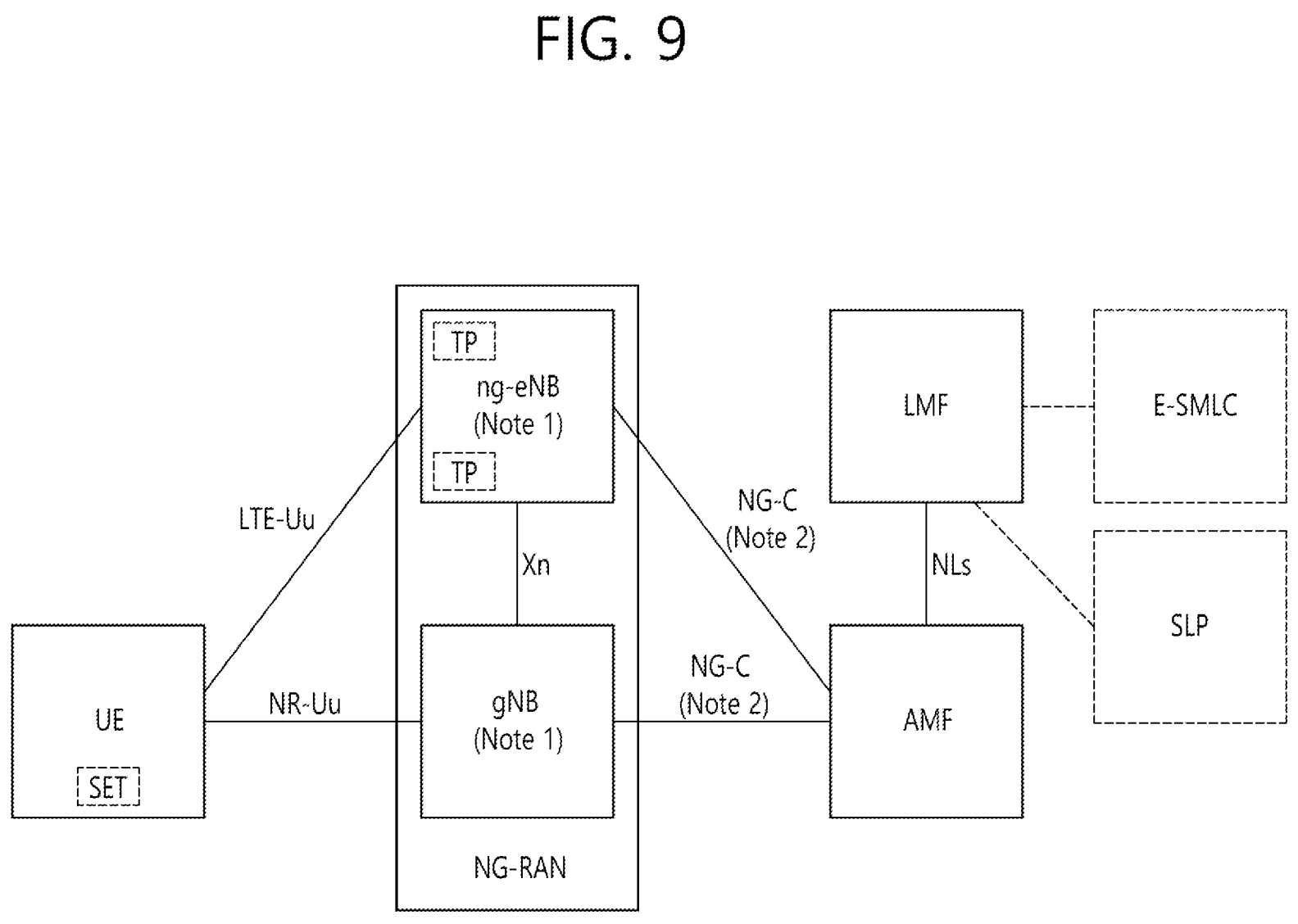

FIG. 9 shows an example of an architecture of a 5G system capable of positioning a UE having access to a next generation-radio access network (NG-RAN) or an E-UTRAN based on an embodiment of the present disclosure. The embodiment of FIG. 9 may be combined with various embodiments of the present disclosure.

Referring to FIG. 9, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centre (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 10:
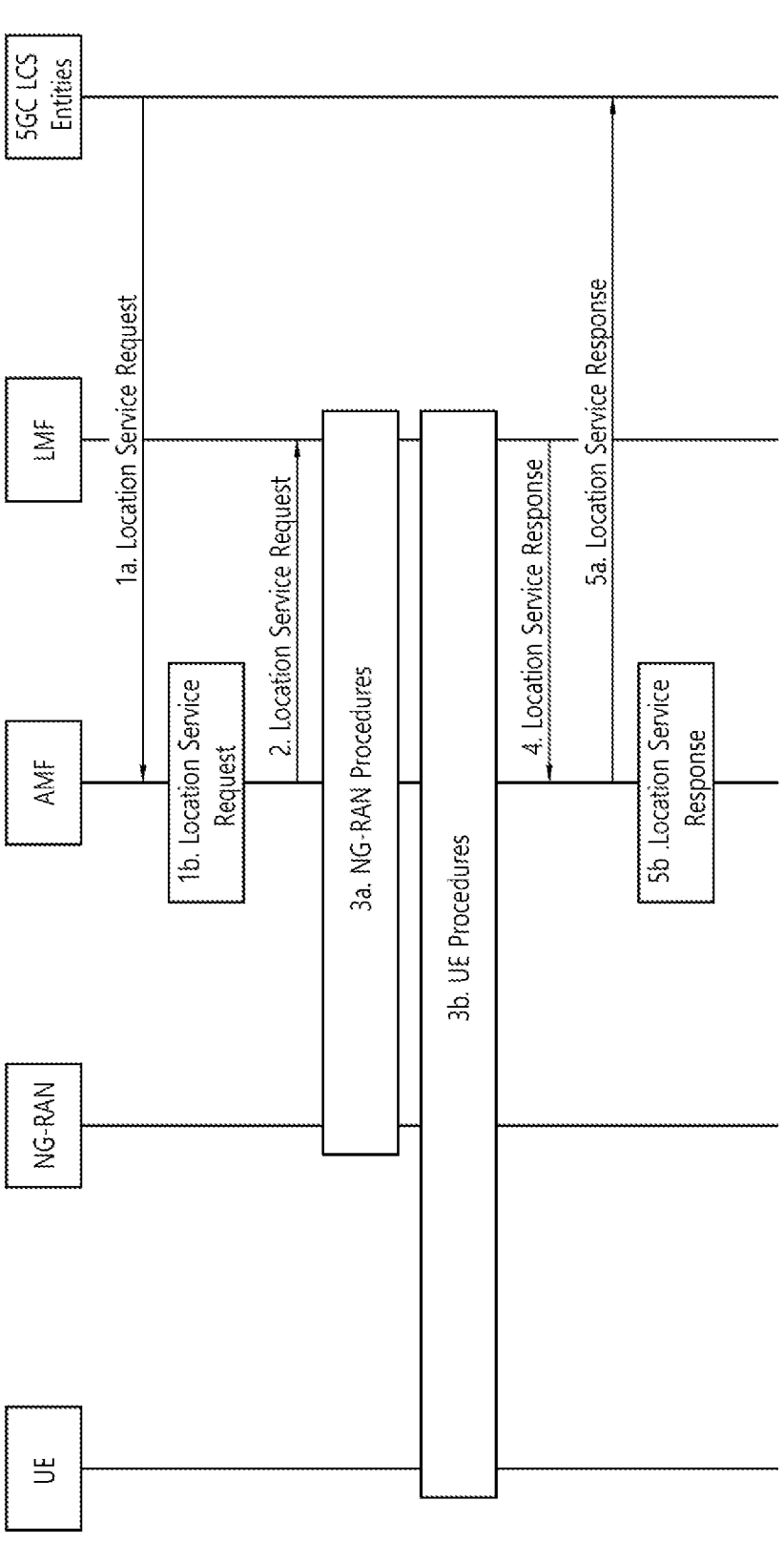
FIG. 10 shows an example of implementing a network for measuring a location of a UE based on an embodiment of the present disclosure.

FIG. 10 shows an example of implementing a network for measuring a location of a UE based on an embodiment of the present disclosure. The embodiment of FIG. 10 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 10. That is, it may be assumed in FIG. 10 that the UE is in a connected mode. However, due to signaling and data inactivation or the like, the signaling connection may be released by NG-RAN while a positioning process is performed.

A network operation process for measuring a location of a UE will be described in detail with reference to FIG. 10. In step a1, a 5GC entity such as GMLC may request a serving AMF to provide a location service for measuring a location of a target UE. However, even if the GMLC does not request for the location service, based on step 1b, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step 2, and the LMF may start location procedures to obtain location measurement data or location measurement assistance data together with a serving ng-eNB and a serving gNB. Additionally, based on step 3b, the LMF may start location procedures for downlink positioning together with the UE. For example, the LMF may transmit assistance data defined in 3GPP TS 36.355, or may obtain a location estimation value or a location measurement value. Meanwhile, step 3b may be performed additionally after step 3a is performed, or may be performed instead of step 3a.

In step 4, the LMF may provide a location service response to the AMF. In addition, the location service response may include information on whether location estimation of the UE is successful and a location estimation value of the UE. Thereafter, if the procedure of FIG. 10 is initiated by step a1, the AMF may transfer the location service response to a 5GC entity such as GMLC, and if the procedure of FIG. 10 is initiated by step 1b, the AMF may use the location service response to provide a location service related to an emergency call or the like.

Figure 11:
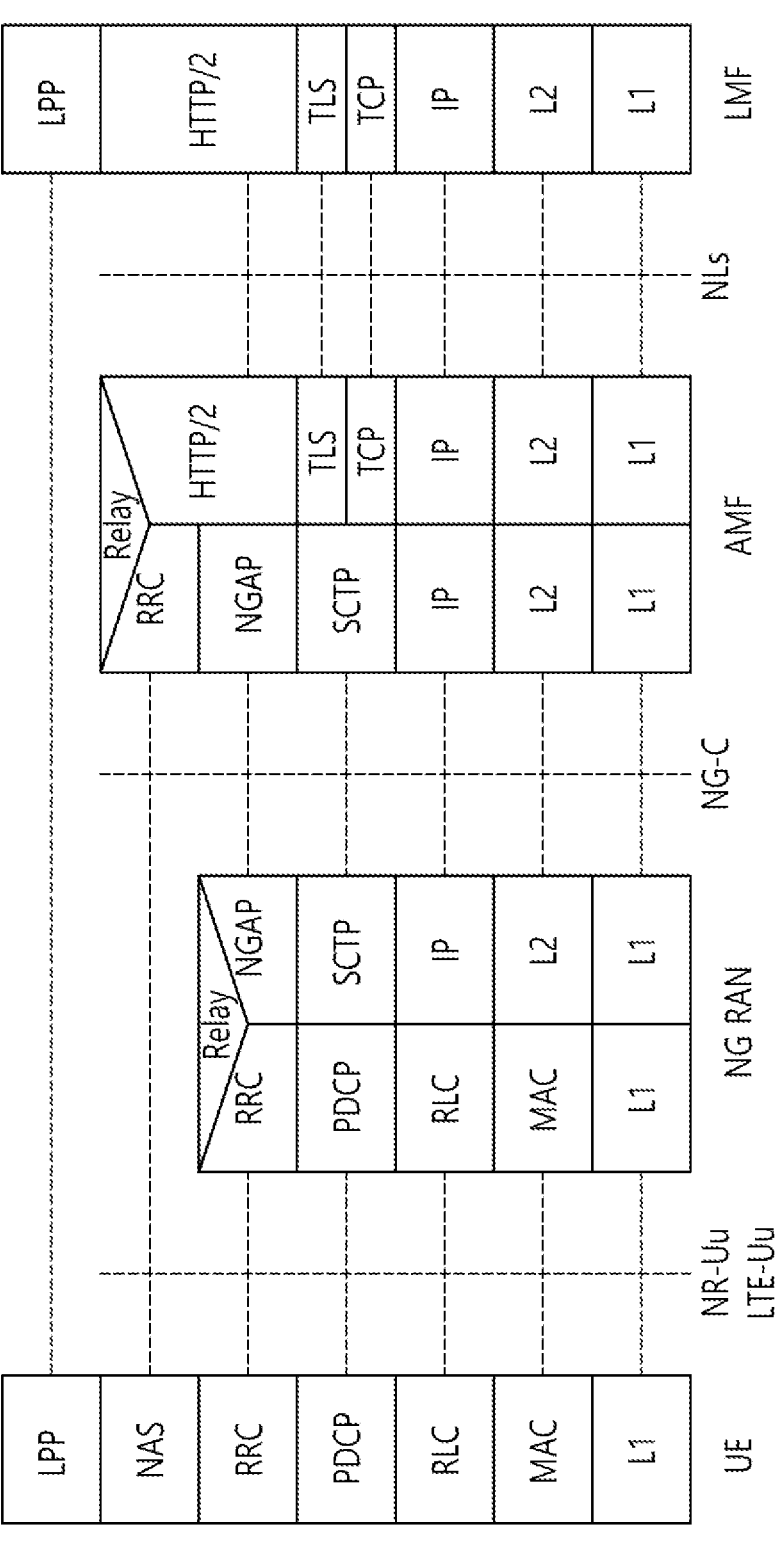
FIG. 11 shows an example of a protocol layer used to support LTE positioning protocol (LPP) message transmission between an LMF and a UE based on an embodiment of the present disclosure.

FIG. 11 shows an example of a protocol layer used to support LTE positioning protocol (LPP) message transmission between an LMF and a UE based on an embodiment of the present disclosure. The embodiment of FIG. 11 may be combined with various embodiments of the present disclosure.

An LPP PDU may be transmitted through a NAS PDU between an AMF and the UE. Referring to FIG. 11, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 12:
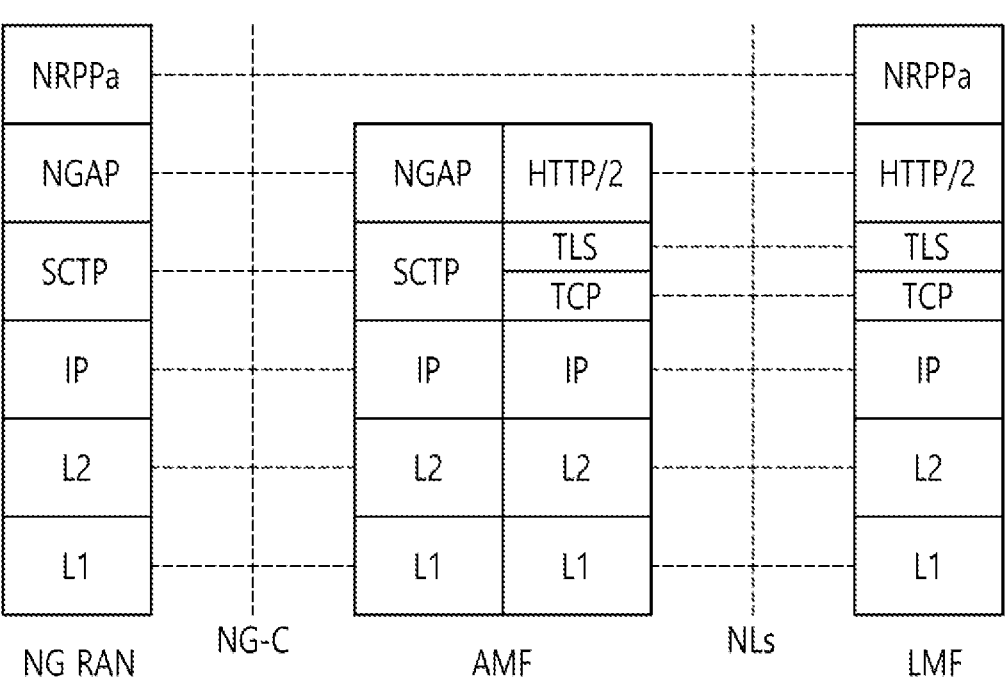
FIG. 12 shows an example of a protocol layer used to support NR positioning protocol A (NRPPa) PDU transmission between an LMF and an NG-RAN node based on an embodiment of the present disclosure.

FIG. 12 shows an example of a protocol layer used to support NR positioning protocol A (NRPPa) PDU transmission between an LMF and an NG-RAN node based on an embodiment of the present disclosure. The embodiment of FIG. 12 may be combined with various embodiments of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TB S), uplink time difference of arrival (UTDOA), etc.

(1) OTDOA (Observed Time Difference Of Arrival)

Figure 13:
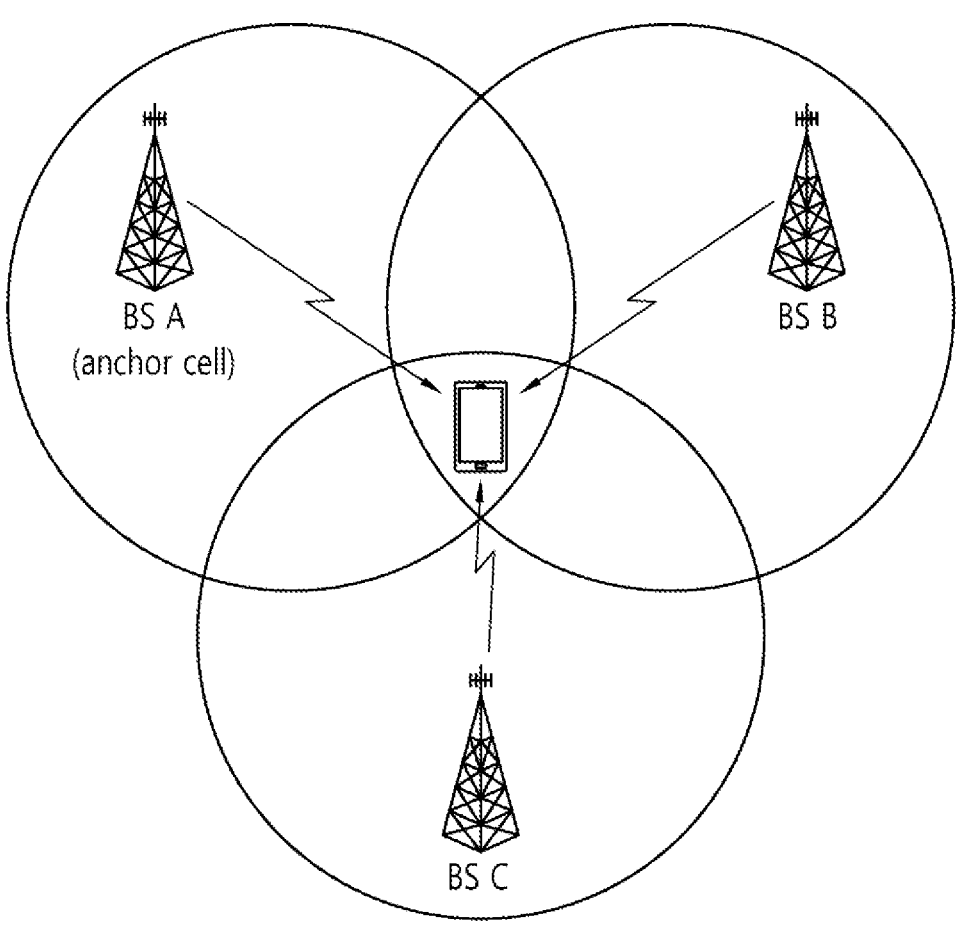
FIG. 13 is a drawing for explaining an OTDOA positioning method based on an embodiment of the present disclosure.

FIG. 13 is a drawing for explaining an OTDOA positioning method based on an embodiment of the present disclosure. The embodiment of FIG. 13 may be combined with various embodiments of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad \text{[Equation 1]}$$

Herein, c may be the speed of light, $\{x_t, y_y\}$ may be a (unknown) coordinate of a target UE, $\{x_i, y_i\}$ may be a coordinate of a (known) TP, and $\{x_1 y_1\}$ may be a coordinate of a reference TP (or another TP). Herein, $(T_i\text{-}T_1)$ may be referred to as "real time differences (RTDs)" as a transmission time offset between two TPs, and $n_i$, $n_1$ may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/WLAN reference signal strength indication (RS SI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

Table 13 shows an example of reference signal time difference (RSTD). The RSTD of Table 13 may be applied for SL positioning.

TABLE 13

| Definition | The relative timing difference between the E-UTRA neighbour cell j and the E-UTRA reference cell i, defined as $T_{SubframeRxj} - T_{SubframeRxi}$, where: $T_{SubframeRxj}$ is the time when the UE receives the start of one subframe from E-UTRA cell j $T_{SubframeRxi}$ is the time when the UE receives the corresponding start of one subframe from E-UTRA cell i that is closest in time to the subframe received from E-UTRA cell j. The reference point for the observed subframe time difference shall be the antenna connector of the UE. |
|---|---|
| Applicable for | RRC_CONNECTED inter-RAT |

Table 14 shows an example of DL PRS reference signal received power (RSRP). The DL PRS RSRP of Table 14 may be applied for SL positioning.

TABLE 14

| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
|---|---|
| Applicable for | RRC_CONNECTED intra-frequency, RRC_CONNECTED inter-frequency |

Table 15 shows an example of DL relative signal time difference (RSTD). The DL RSTD of Table 15 may be applied for SL positioning.

TABLE 15

| Definition | DL relative timing difference (DL RSTD) between the positioning node j and the reference positioning node i, is defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
|---|---|
| Applicable for | RRC_CONNECTED intra-frequency RRC_CONNECTED inter-frequency |

Table 16 shows an example of UE Rx-Tx time difference. The UE Rx-Tx time difference of Table 16 may be applied for SL positioning.

TABLE 16

| Definition | The UE Rx – Tx time difference is defined as $T_{UE\text{-}RX} - T_{UE\text{-}TX}$<br>Where:<br>$T_{UE\text{-}RX}$ is the UE received timing of downlink subframe #i from a positioning node, defined by the first detected path in time.<br>$T_{UE\text{-}TX}$ is the UE transmit timing of uplink subframe #j that is closest in time to the subframe #i received from the positioning node.<br>Multiple DL PRS resources can be used to determine the start of one subframe of the first arrival path of the positioning node.<br>For frequency range 1, the reference point for $T_{UE\text{-}RX}$ measurement shall be the Rx antenna connector of the UE and the reference point for $T_{UE\text{-}TX}$ measurement shall be the Tx antenna connector of the UE. For frequency range 2, the reference point for $T_{UE\text{-}RX}$ measurement shall be the Rx antenna of the UE and the reference point for $T_{UE\text{-}TX}$ measurement shall be the Tx antenna of the UE. |
| Applicable for | RRC_CONNECTED intra-frequency<br>RRC_CONNECTED inter-frequency |

Table 17 shows an example of UL Relative Time of Arrival (UL RTOA) (TUL-RTOA). The UL RTOA of Table 17 may be applied for SL positioning.

TABLE 17

| Definition | [The UL Relative Time of Arrival ($T_{UL\text{-}RTOA}$) is the beginning of subframe i containing SRS received in positioning node j, relative to the configurable reference time.]<br>Multiple SRS resources for positioning can be used to determine the beginning of one subframe containing SRS received at a positioning node.<br>The reference point for $T_{UL\text{-}RTOA}$ shall be:<br>- for type 1-C base station TS 38.104 [9]: the Rx antenna connector,<br>  - for type 1-O or 2-O base station TS 38.104 [9]: the Rx antenna,<br>  - for type 1-H base station TS 38.104 [9]: the Rx Transceiver Array Boundary connector. |

Table 18 shows an example of gNB Rx-Tx time difference. The gNB Rx-Tx time difference of Table 18 may be applied for SL positioning.

TABLE 18

| Definition | The gNB Rx – Tx time difference is defined as $T_{gNB\text{-}RX} - T_{gNB\text{-}TX}$<br>Where:<br>$T_{gNB\text{-}RX}$ is the positioning node received timing of uplink subframe #i containing SRS associated with UE, defined by the first detected path in time.<br>$T_{gNB\text{-}TX}$ is the positioning node transmit timing of downlink subframe #j that is closest in time to the subframe #i received from the UE.<br>Multiple SRS resources for positioning can be used to determine the start of one subframe containing SRS.<br>The reference point for $T_{gNB\text{-}RX}$ shall be:<br>  - for type 1-C base station TS 38.104 [9]: the Rx antenna connector,<br>  - for type 1-O or 2-O base station TS 38.104 [9]: the Rx antenna,<br>  - for type 1-H base station TS 38.104 [9]: the Rx Transceiver Array Boundary connector.<br>The reference point for $T_{gNB\text{-}TX}$ shall be:<br>  - for type 1-C base station TS 38.104 [9]: the Tx antenna connector,<br>  - for type 1-O or 2-O base station TS 38.104 [9]: the Tx antenna,<br>  - for type 1-H base station TS 38.104 [9]: the Tx Transceiver Array Boundary connector. |

Table 19 shows an example of UL Angle of Arrival (AoA). The UL AoA of Table 19 may be applied for SL positioning.

TABLE 19

| | |
|---|---|
| Definition | UL Angle of Arrival (UL AoA) is defined as the estimated azimuth angle and vertical angle of a UE with respect to a reference direction, wherein the reference direction is defined:<br>- In the global coordinate system (GCS), wherein estimated azimuth angle is measured relative to geographical North and is positive in a counter-clockwise direction and estimated vertical angle is measured relative to zenith and positive to horizontal direction<br>- In the local coordinate system (LCS), wherein estimated azimuth angle is measured relative to x-axis of LCS and positive in a counter-clockwise direction and estimated vertical angle is measured relatize to z-axis of LCS and positive to x-y plane direction. The bearing, downtilt and slant angles of LCS are defined according to TS 38.901 [14].<br>The UL AoA is determined at the gNB antenna for an UL channel corresponding to this UE. |

Table 20 shows an example of UL SRS reference signal received power (RSRP). The
UL SRS RSRP of Table 20 may be applied for SL positioning.

TABLE 20

| | |
|---|---|
| Definition | UL SRS reference signal received power (UL SRS-RSRP) is defined as linear average of the power contributions (in [W]) of the resource elements carrying sounding reference signals (SRS). UL SRS-RSRP shall be measured over the configured resource elements within the considered measurement frequency bandwidth in the configured measurement time occasions.<br>For frequency range 1, the reference point for the UL SRS-RSRP shall be the antenna connector of the gNB. For frequency range 2, UL SRS-RSRP shall be measured based on the combined signal from antenna elements corresponding to a given receiver branch. For frequency range 1 and 2, if receiver diversity is in use by the gNB, the reported UL SRS-RSRP value shall not be lower than the corresponding UL SRS-RSRP of any of the individual receiver branches. |

Figure 14:
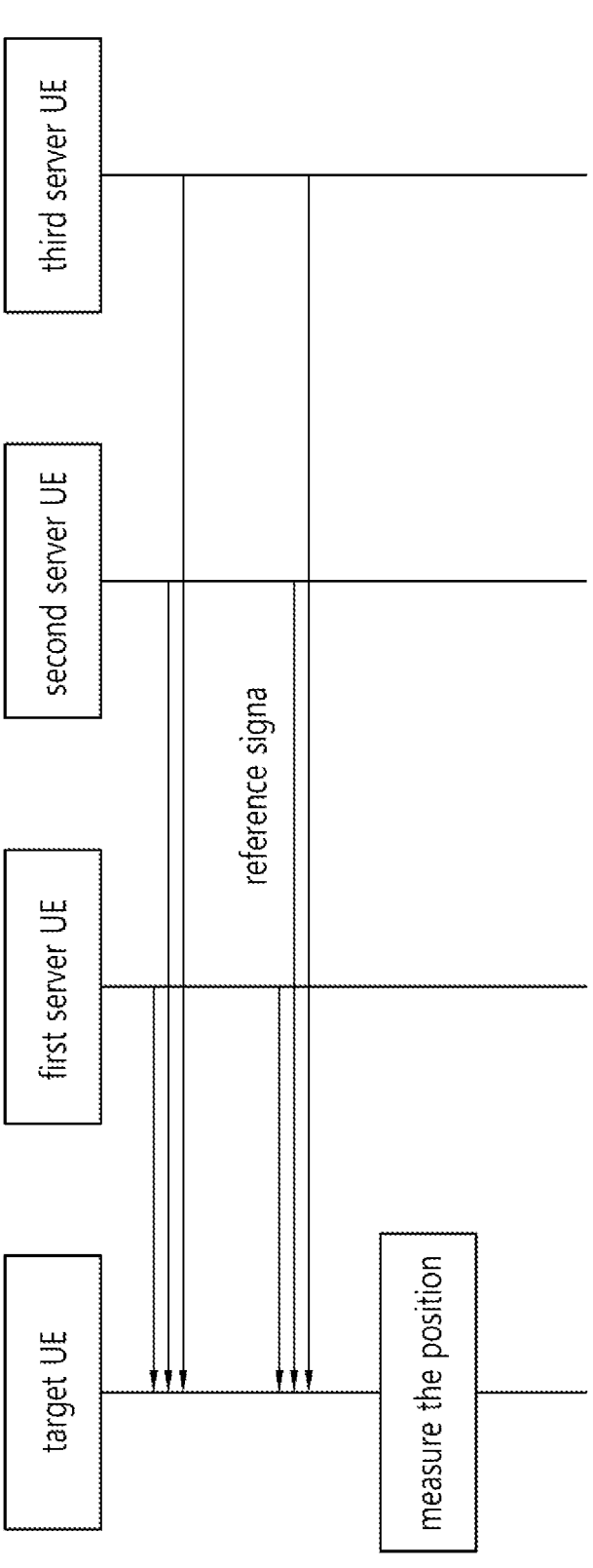
FIG. 14 shows a problem of a method for performing wireless communication related to SL PRS according to one embodiment of the present disclosure.

FIG. 14 shows a problem in a method for performing wireless communication related to SL PRS according to one embodiment of the present disclosure. The embodiment of FIG. 14 may be combined with various embodiments of the present disclosure.

Referring to FIG. 14, according to one embodiment of the present disclosure, for example, a target UE may obtain the UE's position based on time of arrival (TOA) measurements or time of flight (TOF) measurements received from servers (e.g., a server UE (e.g., a first server terminal, a second server terminal, a third server terminal), three or more anchor nodes (anchor cells) or base stations (BSs) (e.g., BS A, BS B, BS C)). For example, the UE may obtain the UE's position based on geographic positions of the servers (e.g., the server UE (e.g., the first server UE, the second server UE, the third server UE), three or more anchor nodes (anchor cells) or base stations (BSs) (e.g., BS A, BS B, BS C)), measurements of time of arrivals of signals or measurements of time of flights (TOFs) received from the respective servers.

For example, the signal may include a sidelink positioning reference signal.

For example, to perform reference signal time difference (RSTD) measurement, the UE may use an autonomous gap or a measurement gap received by requesting the measurement gap from each server. For example, the target UE may measure TOA for each server. For example, the target UE may calculate RSTDs for the first and second servers, RSTDs for the second and third servers, and RSTDs for the third and first servers based on three TOAs and real-time differences (RTDs) of the individual servers. For example, the target UE may determine a geometric hyperbola based on each RSTD. For example, the target UE may estimate a point where hyperbolae determined based on the respective RSTDs intersect as the UE's position. For example, the estimated position of the UE may be determined within a specific range due to uncertainties of TOA measurements.

For example, the target UE receiving an SL PRS may detect information related to SL PRS resources to search for the SL PRS resources. For example, a UE receiving an SL PRS may detect information related to an SL PRS resource to search for SL PRS resources. For example, a UE receiving an SL PRS may perform blind detection on the information related to an SL PRS resource. However, for example, the blind detection may be performed inefficiently. Also, for example, in a relationship with a UE that reserves or uses an SL PRS resource, the UE may have to find information related to the SL PRS resource based on sensing. Therefore, an SL PRS control channel (CCH) through which SL PRS control information related to the SL PRS is transmitted may have to be defined.

However, for example, the BWP through which the SL PRS CCH is transmitted and the BWP through which the SL PRS are transmitted may be different from each other. For example, a resource pool in which the SL PRS CCH is transmitted may be different from a resource pool in which the SL PRS is transmitted. For example, a slot in which the SL PRS CCH is transmitted may be different from a slot in which the SL PRS is transmitted. Also, for example, SL communication may be performed between the target UE and the server UE together with SL positioning. In this case, for example, an SL PRS may not be properly transmitted and received between the target UE and the server within different BWPs, different resource pools, or different slots. For example, when the target UE performs both SL positioning and SL communication, an SL PRS may not be properly transmitted and received between the target UE and the server within different BWPs, different resource pools, or different slots.

In the present disclosure, the following terms may be used.

UE-triggered SL positioning: the procedure may be triggered by the UE.

Base station/location server (LS)-triggered SL positioning: the procedure may be triggered by the base station/LS.

UE-controlled SL positioning: the SL positioning group may be created by the UE.

Base station-controlled SL positioning: the SL positioning group may be created by the base station.

UE-based SL positioning: the UE position may be calculated by the UE.

UE-assisted SL positioning: the UE position may be calculated by the base station/LS.

SL positioning group: UEs that participates in SL positioning

Target UE (T-UE): UE whose position is calculated

Server UE (S-UE): UE that assists T-UE's SL positioning

LS: location server

MG: measurement gap where only SL PRS transmission is allowed

MW: measurement window where both SL data and SL PRS can be transmitted in a multiplexed way According to one embodiment of the present disclosure, an SL PRS transmission resource may be configured using an SL PRS resource set configured by the following information.

SL PRS resource set ID

SL PRS resource ID list—an SL PRS resource ID list within the SL PRS resource set SL PRS resource type—It may be configured as periodic, aperiodic, semi-persistent, or on-demand Alpha for SL PRS power control P0 for SL PRS power control Path loss reference for SL PRS power control—It may be configured as SL SSB, DL PRS, UL SRS, UL SRS for positioning, PSCCH DMRS, PSSCH DMRS, PSFCH, or SL CSI RS According to one embodiment of the present disclosure, the SL PRS resource set may be configured using an SL PRS resource configured by the following information.

SL PRS resource ID

SL PRS comb size—Interval between REs at which an SL PRS is transmitted within the symbol SL PRS comb offset— RE index of the SL PRS transmitted first within the first SL PRS symbol SL PRS comb cyclic shift—cyclic shift used for sequence generation configuring an SL PRS SL PRS start position—index of first symbol in which an SL PRS is transmitted within one slot SL PRS # of symbols—the number of symbols configuring an SL PRS within one slot Freq. domain shift—index of the lowest frequency in the frequency domain at which an SL PRS is transmitted SL PRS BW— frequency bandwidth used for SL PRS transmission SL PRS resource type—It may be configured as periodic, aperiodic, semi-persistent, or on-demand SL PRS periodicity—period between SL PRS resources in the time domain or logical slot unit of a resource pool in which a physical or SL PRS is transmitted SL PRS offset—offset in the time domain until the start of the first SL PRS resource based on the reference timing or logical slot unit of a resource pool in which a physical or SL PRS is transmitted. The reference timing may be the time point at which RRC/MAC-CE/DCI/SCI related to SFN=0 or DFN=0 or the SL PRS resource is received or decoded successfully.

SL PRS sequence ID

SL PRS spatial relation—It may be configured as SL SSB, DL PRS, UL SRS, or UL SRS for positioning or PSCCH DMRS, PSSCH DMRS, PSFCH, or SL CSI RS Meanwhile, according to one embodiment of the present disclosure, a method may have to be defined, by which a UE receiving an SL PRS finds an SL PRS resource without blind detection, and other UEs figure out the SL PRS resource information of the corresponding UE through sensing.

According to one embodiment of the present disclosure, a method for transmitting a control channel for delivering information on an SL PRS resource when an SL PRS is transmitted and an apparatus supporting the method may be proposed.

According to one embodiment of the present disclosure, for example, an RX UE receiving an SL PRS in the SL positioning operation may determine the position of an SL PRS resource in a resource pool and receive the SL PRS in the corresponding resource position without a blind detection operation. For example, for other UEs to obtain SL PRS resource information reserved by a TX UE for future SL PRS transmission through sensing, when the TX UE transmits an SL PRS, it may be necessary to transmit an SL PRS control channel (SL PRS CCH) related to the SL PRS.

In one embodiment of the present disclosure, when BWPs for transmitting an SL PRS and an SL PRS CCH related to the SL PRS are different from each other, the SL PRS CCH may indicate an index for the BWP in which the related SL PRS is to be transmitted. As one embodiment of the present disclosure, for example, a minimum time gap required for BWP switching may be configured (in advance) for the RX UE to receive the SL PRS CCH in BWP #1 and to receive the SL PRS in BWP #2 indicated by the SL PRS CCH. As one embodiment of the present disclosure, the minimum time gap may be a value expressed in units of logical slots from the slot in which the SL PRS CCH is transmitted in the BWP #1 to the slot in which the SL PRS is transmitted in the BWP #2. As one embodiment of the present disclosure, the logical slot unit may be determined based on the configuration information (SCS) of the BWP #2 in which the SL PRS is transmitted. As one embodiment of the present disclosure, the logical slot unit may be determined based on the configuration information (SCS) of the BWP #1 in which the SL PRS CCH is transmitted.

As one embodiment of the present disclosure, for example, the UE receiving the SL PRS CCH in the BWP #1 may determine, based on the BWP #2 configuration information (SCS), the nearest logical slot after an offset in the logical units belonging to the resource pool indicated by the SL PRS CCH from the time point at which the SL PRS CCH is received as the slot in which the SL PRS is transmitted. As one embodiment of the present disclosure, the offset value may be limited to a value greater than or equal to the minimum time gap.

In one embodiment of the present disclosure, for example, when the SL PRS and the SL PRS CCH related to the SL PRS are transmitted through the same BWP, but resource pools are different within the BWP, the SL PRS CCH may indicate an index for a resource pool in which the related SL PRS is to be transmitted.

In one embodiment of the present disclosure, for example, an RX UE may receive an SL PRS CCH from resource pool #1, and the minimum time gap required for resource pool switching may be configured (in advance) to receive the SL PRS from resource pool #2. In one embodiment of the present disclosure, the minimum time gap may be a value in units of logical slots expressing a distance from the slot in which the SL PRS CCH is transmitted in the resource pool #1 to the slot in which the SL PRS is transmitted in the resource pool #2. According to one embodiment of the present disclosure, the logical slot unit may be determined based on the configuration information (SCS) of resource pool #2 to which the SL PRS is transmitted. In one embodiment of the present disclosure, the logical slot unit may be determined based on the configuration information (SCS) of resource pool #1 to which the SL PRS CCH is transmitted.

As one embodiment of the present disclosure, for example, a UE receiving the SL PRS CCH in the resource pool #1 may determine, based on the resource pool #2 configuration information (SCS), the nearest logical slot after an offset in the logical units belonging to the resource pool indicated by the SL PRS CCH from the time point at which the SL PRS is received as the slot in which the SL PRS is transmitted. In one embodiment of the present disclosure, the offset value may be limited to a value greater than or equal to the minimum time gap.

In one embodiment of the present disclosure, when the same BWP is used for transmitting an SL PRS and an SL PRS CCH related to the SL PRS, and the same resource pool is used within the BWP, the SL PRS CCH may be transmitted using a different slot from that used for transmitting the related SL PRS. For example, the SL PRS CCH may indicate an index for a slot to which the SL PRS is transmitted. As one embodiment of the present disclosure, the SL PRS CCH may indicate an offset from a slot to which the SL PRS CCH is transmitted to a slot to which the SL PRS is transmitted in units of logical slots.

In one embodiment of the present disclosure, the offset value may be configured (in advance) within a resource pool. As one embodiment of the present disclosure, a slot to which the SL PRS is transmitted may be periodically (in advance) configured within a resource pool. According to one embodiment of the present disclosure, a slot to which the SL PRS CCH is transmitted may be periodically configured (in advance) in a resource pool.

Through one embodiment of the present disclosure, the UE processing time required for a TX UE to transmit a related SL PRS after transmitting an SL PRS CCH may be secured, or the UE processing time required for an RX UE to receive a related SL PRS after receiving an SL PRS CCH through sensing, for example, the time to decode the SL PRS CCH, may be secured.

In one embodiment of the present disclosure, a slot configured only for SL positioning may use the first symbol in the slot as an AGC symbol, use the last symbol as a TX/RX switching symbol, and use the remaining symbols for transmitting an SL PRS and/or an SL PRS CCH.

In one embodiment of the present disclosure, when resources for both SL PRS transmission and reception are allocated within the slot for SL positioning, a gap symbol for TX/RX switching may be inserted between the SL PRS resource for the transmission and the SL PRS resource for the reception. In one embodiment of the present disclosure, when one or more transmission SL PRS resources and/or reception SL PRS resources are allocated within the slot for SL positioning, to reduce overhead due to the gap symbol, the one or more transmission SL PRS resources may be allocated to successive symbols within the slot, and the one or more reception SL PRS resources may be allocated to successive symbols within the slot, and only one gap symbol may be inserted between the set of the successive transmission SL PRS resource symbols and the set of the successive reception SL PRS resource symbols.

In one embodiment of the present disclosure, when one SL slot is shared and used for SL communication and SL positioning, a set of successive symbols for SL communication and a set of successive symbols for SL positioning may be configured so that they do not overlap each other within the one slot.

According to one embodiment of the present disclosure, when one SL slot is shared and used for SL communication and SL positioning, a set of successive frequency resources for SL communication and a set of successive frequency resources for SL positioning may be configured so that they do not overlap each other within the one slot.

According to various embodiments of the present disclosure, a method for transmitting an SL PRS CCH may be proposed.

Figure 15:
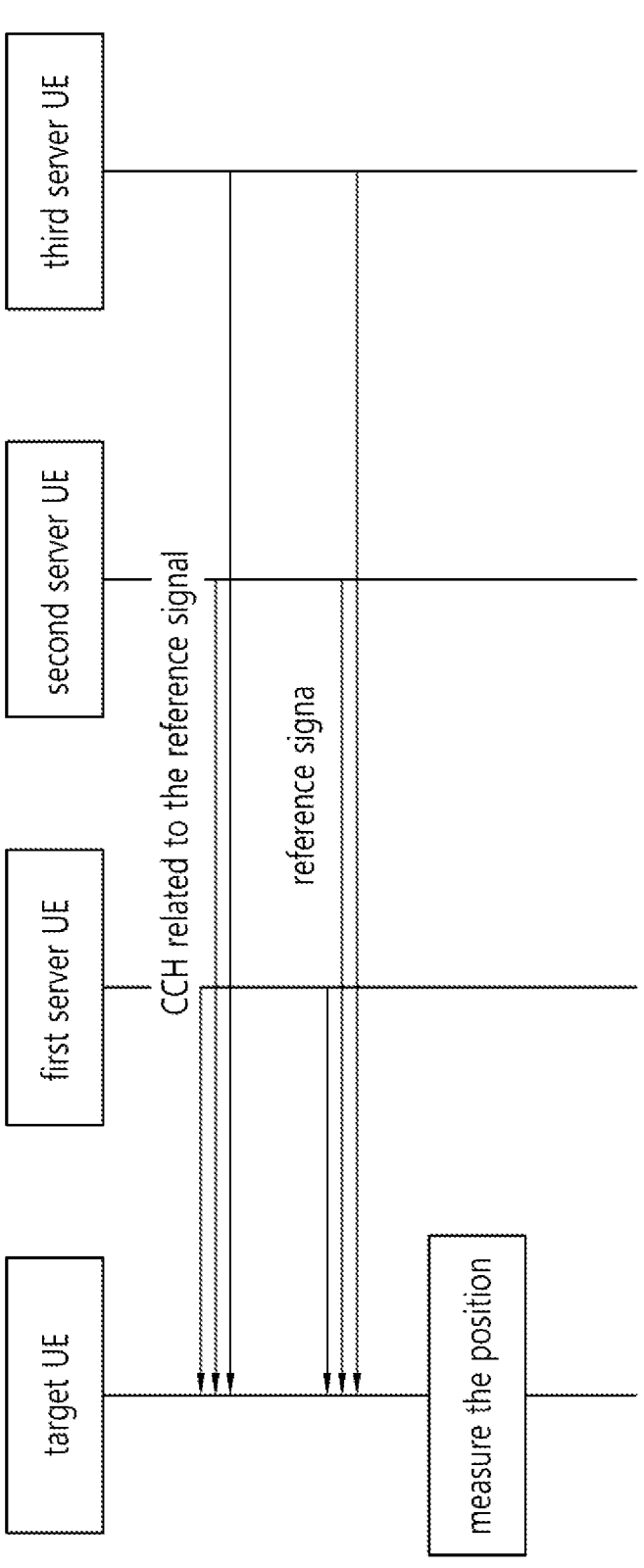
FIG. 15 shows a method for performing wireless communication related to SL PRS according to one embodiment of the present disclosure.

FIG. 15 shows a method for performing wireless communication related to SL PRS according to one embodiment of the present disclosure. The embodiment of FIG. 15 may be combined with various embodiments of the present disclosure.

Referring to FIG. 15, according to one embodiment of the present disclosure, for example, a target UE may receive control information related to a reference signal through a CCH related to the reference signal from servers (e.g., a server UE (e.g., a first server terminal, a second server terminal, a third server terminal), three or more anchor nodes (anchor cells) or base stations (BSs) (e.g., BS A, BS B, BS C)). For example, the target UE may receive a reference signal from the server. For example, the target UE may obtain the UE's position based on the time of arrival (TOA) measurements or time of flight (TOF) measurements of a reference signal received from the server. For example, the UE may obtain the UE's position based on geographic positions of the servers (e.g., the server UE (e.g., the first server UE, the second server UE, the third server UE), three or more anchor nodes (anchor cells) or base stations (BSs) (e.g., BS A, BS B, BS C)), measurements of time of arrivals of signals or measurements of time of flights (TOFs) received from the respective servers.

For example, the reference signal may include a sidelink positioning reference signal. For example, a CCH related to the reference signal may include an SL PRS CCH. For example, the control information may be related to an SL PRS. For example, the control information may include any one of index information of a BWP through which an SL PRS is transmitted/received, index information of a resource pool through which an SL PRS is transmitted/received, or index information of a slot through which an SL PRS is transmitted/received.

For example, to perform reference signal time difference (RSTD) measurement, the UE may use an autonomous gap or a measurement gap received by requesting the measurement gap from each server. For example, the target UE may measure TOA for each server. For example, the target UE may calculate RSTDs for the first and second servers, RSTDs for the second and third servers, and RSTDs for the third and first servers based on three TOAs and real-time differences (RTDs) of the individual servers. For example, the target UE may determine a geometric hyperbola based on each RSTD. For example, the target UE may estimate a point where hyperbolae determined based on the respective RSTDs intersect as the UE's position. For example, the estimated position of the UE may be determined within a specific range due to uncertainties of TOA measurements.

For example, a target UE receiving control information related to an SL PRS through an SL PRS CCH may detect information related to an SL PRS resource based on the control information. Also, for example, in a relationship with a UE that reserves or uses an SL PRS resource, the UE may find information related to the SL PRS resource based on sensing through the control information related to the SL PRS.

Also, for example, even when the BWP to which an SL PRS CCH is transmitted is different from the BWP to which an SL PRS is transmitted, SL positioning between the target UE and the server UE may be transmitted and received successfully. For example, even when the resource pool to which an SL PRS CCH is transmitted is different from the resource pool to which an SL PRS is transmitted, SL positioning between the target UE and the server UE may be transmitted and received successfully. For example, even when the slot to which an SL PRS CCH is transmitted is different from the slot to which an SL PRS is transmitted, SL positioning between the target UE and the server UE may be transmitted and received successfully. For example, when the target UE performs SL positioning and SL communication together, an SL PRS may be transmitted and received successfully between the target UE and the server within different BWPs, different resource pools, or different slots. Also, for example, a UE receiving an SL PRS may not perform blind detection on the information related to the SL PRS resource. Therefore, for example, SL positioning may be performed efficiently. For example, SL PRS resources may be managed efficiently.

Figure 16:
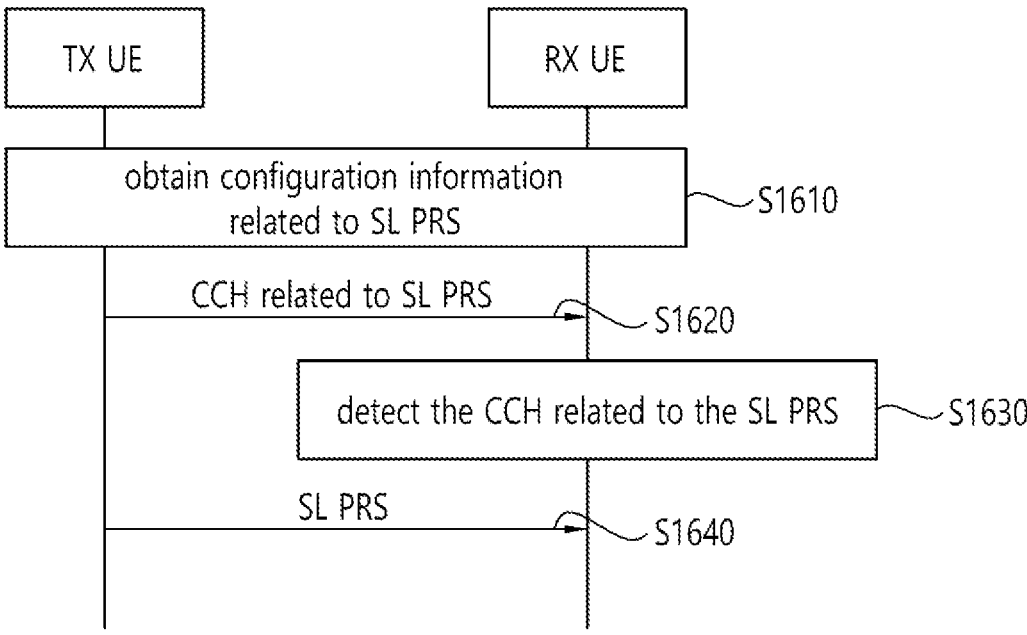
FIG. 16 shows a procedure for performing wireless communication related to SL PRS according to one embodiment of the present disclosure.

FIG. 16 shows a procedure for performing wireless communication related to SL PRS according to one embodiment of the present disclosure. The embodiment of FIG. 16 may be combined with various embodiments of the present disclosure.

Referring to FIG. 16, according to one embodiment of the present disclosure, for example, in the S1610 step, the TX UE and/or the RX UE may obtain configuration information related to at least one configuration information. In the S1620 step, the TX UE may transmit control information related to a first SL PRS to the RX UE through a CCH related to the first SL PRS. For example, the control information may include at least one of index information of a BWP through which the SL PRS is transmitted/received, index information of a resource pool through which the SL PRS is transmitted/received, or index information of a slot through which the SL PRS is transmitted/received.

For example, in the S1630 step, the TX UE may decode a CCH related to the first SL RPS. For example, the TX UE may obtain at least one of index information of a BWP through which the SL PRS is transmitted/received, index information of a resource pool through which the SL PRS is transmitted/received, or index information of a slot through which the SL PRS is transmitted/received, the obtained at least one index information being represented (or indicated) by the control information.

For example, in the S1640 step, the control information may transmit the first SL PRS based on the control information. For example, the RX UE may perform SL positioning based on the first SL PRS.

One embodiment of the present disclosure may provide various effects. According to one embodiment of the present disclosure, for example, since the index of a BWP/resource pool/slot of an SL PRS is indicated based on the index information, a UE performing SL positioning may easily recognize the position of an SL PRS resource without involving blind detection. According to one embodiment of the present disclosure, for example, since other UEs are enabled to obtain the control information indicating the index of a BWP/resource pool/slot of an SL PRS through sensing, a resource deadlock may be avoided between a UE performing SL positioning and other UEs. According to one embodiment of the present disclosure, for example, since resources for SL positioning do not overlap each other, SL communication and SL positioning may be performed efficiently. According to one embodiment of the present disclosure, for example, SL PRS resources may be managed efficiently.

For example, a parameter value that is related to the application or non-application of the aforementioned rule and/or that is related to the proposed method/rule of the present disclosure may be configured/allowed specifically to (or differently or independently from) a service type. For example, a parameter value that is related to the application or non-application of the aforementioned rule and/or that is related to the proposed method/rule of the present disclosure may be configured/allowed specifically to (or differently or independently from) (LCH or service) priority. For example, a parameter value that is related to the application or non-application of the aforementioned rule and/or that is related to the proposed method/rule of the present disclosure may be configured/allowed specifically to (or differently or independently from) QoS requirements (e.g., latency, reliability, minimum communication range). For example, a parameter value that is related to the application or non-application of the aforementioned rule and/or that is related to the proposed method/rule of the present disclosure may be configured/allowed specifically to (or differently or independently from) PQI parameters. For example, a parameter value that is related to the application or non-application of the aforementioned rule and/or that is related to the proposed method/rule of the present disclosure may be configured/allowed specifically to (or differently or independently from) HARQ feedback ENABLED LCH/MAC PDU (transmission). For example, a parameter value that is related to the application or non-application of the aforementioned rule and/or that is related to the proposed method/rule of the present disclosure may be configured/allowed specifically to (or differently or independently from) HARQ feedback DISABLED LCH/MAC PDU (transmission). For example, a parameter value that is related to the application or non-application of the aforementioned rule and/or that is related to the proposed method/rule of the present disclosure may be configured/allowed specifically to (or differently or independently from) a CBR measurement value of a resource pool. For example, a parameter value that is related to the application or non-application of the aforementioned rule and/or that is related to the proposed method/rule of the present disclosure may be configured/allowed specifically to (or differently or independently from) an SL cast type (e.g., unicast, groupcast, broadcast). For example, a parameter value that is related to the application or non-application of the aforementioned rule and/or that is related to the proposed method/rule of the present disclosure may be configured/allowed specifically to (or differently or independently from) an SL groupcast HARQ feedback option (e.g., NACK only feedback, ACK/NACK feedback, TX-RX range-based NACK only feedback). For example, a parameter value that is related to the application or non-application of the aforementioned rule and/or that is related to the proposed method/rule of the present disclosure may be configured/allowed specifically to (or differently or independently from) SL mode 1 CG type (e.g., SL CG type 1 or SL CG type 2). For example, a parameter value that is related to the application or non-application of the aforementioned rule and/or that is related to the proposed method/rule of the present disclosure may be configured/allowed specifically to (or differently or independently from) SL mode type (e.g., mode 1 or mode 2). For example, a parameter value that is related to the application or non-application of the aforementioned rule and/or that is related to the proposed method/rule of the present disclosure may be configured/allowed specifically to (or differently or independently from) a resource pool. For example, a parameter value that is related to the application or non-application of the aforementioned rule and/or that is related to the proposed method/rule of the present disclosure may be configured/allowed specifically to (or differently or independently from) whether or not the resource pool is configured of PSFCH resource. For example, a parameter value that is related to the application or non-application of the aforementioned rule and/or that is related to the proposed method/rule of the present disclosure may be configured/allowed specifically to (or differently or independently from) a source (L2) ID. For example, a parameter value that is related to the application or non-application of the aforementioned rule and/or that is related to the proposed method/rule of the present disclosure may be configured/allowed specifically to (or differently or independently from) a destination (L2) ID. For example, a parameter value that is related to the application or non-application of the aforementioned rule and/or that is related to the proposed method/rule of the present disclosure may be configured/allowed specifically to (or differently or independently from) a PC5 RRC connection link. For example, a parameter value that is related to the application or non-application of the aforementioned rule and/or that is related to the proposed method/rule of the present disclosure may be configured/allowed specifically to (or differently or independently from) an SL link. For example, a parameter value that is related to the application or non-application of the aforementioned rule and/or that is related to the proposed method/rule of the present disclosure may be configured/allowed specifically to (or differently or independently from) a connection status (with a base station) (e.g., RRC CONNECTED state, IDLE state, INACTIVE state). For example, a parameter value that is related to the application or non-application of the aforementioned rule and/or that is related to the proposed method/rule of the present disclosure may be configured/allowed specifically to (or differently or independently from) an SL HARQ process (ID). For example, a parameter value that is related to the application or non-application of the aforementioned rule and/or that is related to the proposed method/rule of the present disclosure may be configured/allowed specifically to (or differently or independently from) a performance or non-performance of an SL DRX operation (of the TX UE or RX UE). For example, a parameter value that is related to the application or non-application of the aforementioned rule and/or that is related to the proposed method/rule of the present disclosure may be configured/allowed specifically to (or differently or independently from) whether or not the (TX or RX) UE is a power saving UE. For example, a parameter value that is related to the application or non-application of the aforementioned rule and/or that is related to the proposed method/rule of the present disclosure may be configured/allowed specifically to (or differently or independently from) a case where PSFCH TX and PSFCH RX (and/or a plurality of PSFCH TXs (exceeding the UE capability)) overlap (in the viewpoint of a specific UE). For example, a parameter value that is related to the application or non-application of the aforementioned rule and/or that is related to the proposed method/rule of the present disclosure may be configured/allowed specifically to (or differently or independently from) a case where an RX UE has actually received PSCCH (and/or PSSCH) (re-)transmission (successfully) from a TX UE.

For example, in the present disclosure, the wording for configuration (or designation) may be extendedly interpreted as a form of informing (or notifying), by a base station, to a UE through a pre-defined (physical layer or higher layer) channel/signal (e.g., SIB, RRC, MAC CE) (and/or a form being provided through a pre-configuration and/or a form of informing (or notifying), by the UE, to another UE through a pre-defined (physical layer or higher layer) channel/signal (e.g., SL MAC CE, PC5 RRC)).

For example, in the present disclosure, the wording for PSFCH may be extendedly interpreted as (NR or LTE) PSSCH (and/or (NR or LTE) PSCCH) (and/or (NR or LTE) SL SSB (and/or UL channel/signal)). Additionally, the proposed method of the present disclosure may be extendedly used by being inter-combined (to a new type of method).

For example, in the present disclosure, a specific threshold value may be pre-defined or may mean a threshold value that is (pre-)configured by a network or base station or a higher layer (including an application layer) of a UE. For example, in the present disclosure, a specific configuration value may be pre-defined or may mean a value that is (pre-)configured by a network or base station or a higher layer (including an application layer) of a UE. For example, an operation that is configured by the network/base station may mean an operation that is (pre-)configured by the base station to the UE via higher layer signaling, or that is configured/signaled by the base station to the UE through a MAC CE, or that is signaled by the base station to the UE through DCI.

Figure 17:
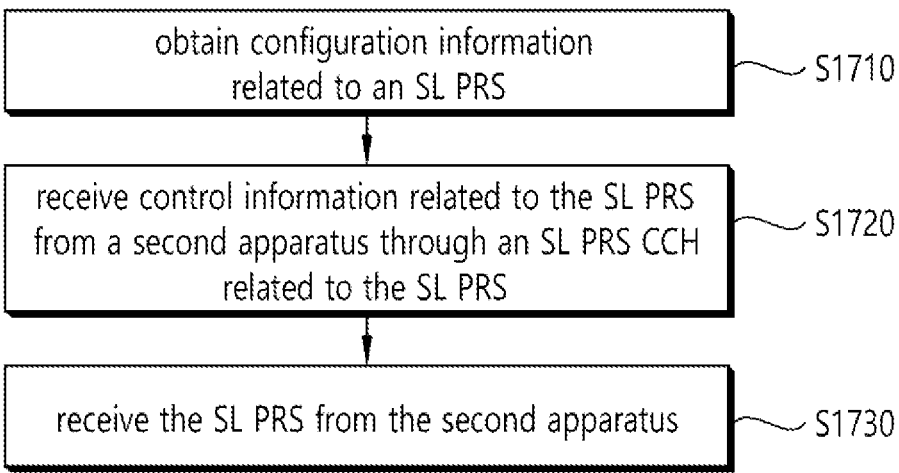
FIG. 17 shows a method for performing wireless communication by a first device, based on an embodiment of the present disclosure.

FIG. 17 shows a method for performing wireless communication by a first device according to one embodiment of the present disclosure. The embodiment of the present disclosure may be combined with various embodiments of the present disclosure.

Referring to FIG. 17, in the S1710 step, for example, the first apparatus may obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. In the S1720 step, for example, the first apparatus may receive control information related to the SL PRS from a second apparatus through an SL PRS control channel (CCH) related to the SL PRS. In the S1730 step, for example, the first apparatus may receive the SL PRS from the second apparatus. For example, the control information related to the SL PRS may include at least one of index information of a bandwidth part (BWP) or index information of a resource pool.

Additionally or alternatively, the BWP may include a BWP in which the SL PRS is received.

Additionally or alternatively, the resource pool may include a resource pool in which the SL PRS is received.

Additionally or alternatively, the SL PRS may include an SL PRS for obtaining at least one of information related to a distance between the first apparatus and the second apparatus or information related to the position of the second apparatus.

Additionally or alternatively, the index information of the resource pool may include the information representing the resource pool in which the SL PRS is received.

Additionally or alternatively, the index information of the BWP may include the information representing the BWP in which the SL PRS is received.

Additionally or alternatively, the first apparatus may switch to the BWP based on the control information.

Additionally or alternatively, the control information may include the information related to the minimum time gap required for BWP switching.

Additionally or alternatively, the information related to the minimum time gap may include information related to a time gap from a first slot in which the control information is received to a second slot in which the SL PRS is received.

Additionally or alternatively, the time gap may be in a unit of a logical slot.

Additionally or alternatively, the control information may include information related to a slot offset in a unit of a logical slot.

Additionally or alternatively, the first apparatus may determine a first logical slot after the slot offset from a first time at which the control information is received as a second slot in which the SL PRS is received.

Additionally or alternatively, the transmission resource set or the reception resource set may include at least one symbol for transmission/reception switching between a transmission resource for the PRS transmission and a reception resource for the PRS reception.

Additionally or alternatively, the transmission resource for the PRS transmission may include a successive first symbol.

Additionally or alternatively, the reception resource for the PRS reception may include a successive second symbol.

Additionally or alternatively, the at least one symbol may be a symbol between the first symbol and the second symbol.

Additionally or alternatively, the configuration information related to the SL PRS may further include information for configuring a symbol set for the SL communication and a symbol set for the SL PRS not to overlap each other within a single slot.

Additionally or alternatively, the configuration information related to the SL PRS may further include information for configuring a frequency resource set for the SL communication and a frequency resource set for the SL PRS not to overlap each other within a single slot.

The proposed method may be applied to an apparatus according to various embodiments of the present disclosure. First, a processor 102 of a first apparatus 100 may obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the processor 102 of the first apparatus 100 may execute the instructions to control the transceiver 106 to receive control information related to the SL PRS from a second apparatus through an SL PRS control channel (CCH) related to the SL PRS. For example, the processor 102 of the first apparatus 100 may execute the instructions to control the transceiver 106 to receive the SL PRS from the second apparatus. For example, the control information related to the SL PRS may include at least one of index information of a bandwidth part (BWP) or index information of a resource pool.

According to one embodiment of the present disclosure, a first apparatus performing wireless communication may be provided. The first apparatus comprises one or more memories storing instructions; one or more transceivers; and one or more processors connected to the one or more memories and the one or more transceivers, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the one or more processors may execute the instructions to receive control information related to the SL PRS from a second apparatus through an SL PRS control channel (CCH) related to the SL PRS. For example, the one or more processors may execute the instructions to receive the SL PRS from the second apparatus. For example, the control information related to the SL PRS may include at least one of index information of a bandwidth part (BWP) or index information of a resource pool.

According to one embodiment of the present disclosure, an apparatus configured to control a first UE may be provided. The apparatus comprises one or more processors; and one or more memories operably connected to the one or more processors and storing instructions, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, control information related to the SL PRS may be received from a second UE through an SL PRS control channel (CCH) related to the SL PRS. For example, the one or more processors may execute the instructions to receive the SL PRS from the second UE. For example, the control information related to the SL PRS may include at least one of index information of a bandwidth part (BWP) or index information of a resource pool.

According to one embodiment of the present disclosure, a non-transitory computer-readable storage medium having instructions thereon may be provided. The instructions, when executed by one or more processors, may cause the one or more processors to obtain configuration information related to a sidelink (SL) positioning reference signal (PRS) by a first apparatus. For example, the configuration information related to the SL PRS may include at least one of information related to a transmission resource set for transmission of the SL PRS or information related to a reception resource set for reception of the SL PRS. For example, the instructions, when executed by one or more processors, may control the one or more processors to receive control information related to the SL PRS from a second apparatus through an SL PRS control channel (CCH) related to the SL PRS by the first apparatus. For example, the instructions, when executed by one or more processors, may control the one or more processors to receive the SL PRS from the second apparatus by the first apparatus. For example, control information related to the SL PRS may include at least one of index information of a bandwidth part (BWP) or index information of a resource pool.

Figure 18:
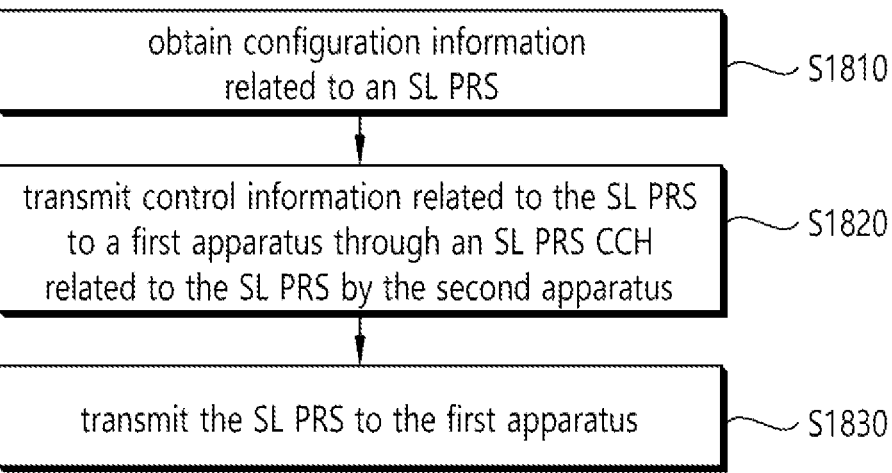
FIG. 18 shows a method for performing wireless communication by a second device, based on an embodiment of the present disclosure.

FIG. 18 shows a method for performing wireless communication by a second device according to one embodiment of the present disclosure. The embodiment of FIG. 18 may be combined with various embodiments of the present disclosure.

Referring to FIG. 18, in the S1810 step, for example, the second apparatus may obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. In the S1820 step, for example, the second apparatus may transmit control information related to the SL PRS to a first apparatus through an SL PRS control channel (CCH) related to the SL PRS. In the S1830 step, for example, the second apparatus may transmit the SL PRS to the first apparatus. For example, the control information related to the SL PRS may include at least one of index information of a bandwidth part (BWP) or index information of a resource pool.

The proposed method may be applied to an apparatus according to various embodiments of the present disclosure. First, a processor 202 of a second apparatus 200 may obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the processor 202 of the second apparatus 200 may execute the instructions to control the transceiver 206 to transmit control information related to the SL PRS to a first apparatus through an SL PRS control channel (CCH) related to the SL PRS. For example, the processor 202 of the second apparatus 200 may execute the instructions to control the transceiver 206 to transmit the SL PRS to the first apparatus. For example, the control information related to the SL PRS may include at least one of index information of a bandwidth part (BWP) or index information of a resource pool.

According to one embodiment of the present disclosure, a second apparatus performing wireless communication may be provided. The second apparatus comprises one or more memories storing instructions; one or more transceivers; and one or more processors connected to the one or more memories and the one or more transceivers, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the one or more processors may execute the instructions to transmit control information related to the SL PRS to a first apparatus through an SL PRS control channel (CCH) related to the SL PRS. For example, the one or more processors may execute the instructions to transmit the SL PRS to the first apparatus. For example, the control information related to the SL PRS may include at least one of index information of a bandwidth part (BWP) or index information of a resource pool.

Additionally or alternatively, the BWP may include a BWP in which the SL PRS is received.

Additionally or alternatively, the resource pool may include a resource pool in which the SL PRS is received.

Additionally or alternatively, the SL PRS may include an SL PRS for obtaining at least one of information related to a distance between the first apparatus and the second apparatus or information related to the position of the second apparatus.

Additionally or alternatively, the index information of the resource pool may include the information representing the resource pool in which the SL PRS is received.

Additionally or alternatively, the index information of the BWP may include the information representing the BWP in which the SL PRS is received.

Additionally or alternatively, the second apparatus may switch to the BWP based on the control information.

Additionally or alternatively, the control information may include the information related to the minimum time gap required for BWP switching.

Additionally or alternatively, the information related to the minimum time gap may include information related to a time gap from a first slot in which the control information is received to a second slot in which the SL PRS is received.

Additionally or alternatively, the time gap may be in a unit of a logical slot.

Additionally or alternatively, the control information may include information related to a slot offset in a unit of a logical slot.

Additionally or alternatively, the second apparatus may determine a first logical slot after the slot offset from a first time at which the control information is received as a second slot in which the SL PRS is received.

Additionally or alternatively, the transmission resource set or the reception resource set may include at least one symbol for transmission/reception switching between a transmission resource for the PRS transmission and a reception resource for the PRS reception.

Additionally or alternatively, the transmission resource for the PRS transmission may include a successive first symbol.

Additionally or alternatively, the reception resource for the PRS reception may include a successive second symbol.

Additionally or alternatively, the at least one symbol may be a symbol between the first symbol and the second symbol.

Additionally or alternatively, the configuration information related to the SL PRS may further include information for configuring a symbol set for the SL communication and a symbol set for the SL PRS not to overlap each other within a single slot.

Additionally or alternatively, the configuration information related to the SL PRS may further include information for configuring a frequency resource set for the SL communication and a frequency resource set for the SL PRS not to overlap each other within a single slot.

According to one embodiment of the present disclosure, an apparatus configured to control a second UE may be provided. The apparatus comprises one or more processors; and one or more memories operably connected to the one or more processors and storing instructions, wherein the one or more processors execute the instructions to obtain configuration information related to a sidelink (SL) positioning reference signal (PRS). For example, the configuration information related to the SL PRS may include at least one of information related to a transmission resource set for transmission of the SL PRS or information related to a reception resource set for reception of the SL PRS. For example, the one or more processors may execute the instructions to transmit control information related to the SL PRS to the first UE through an SL PRS control channel (CCH) related to the SL PRS. For example, the one or more processors may execute the instructions to transmit the SL PRS to the first UE. For example, the control information related to the SL PRS may include at least one of index information of a bandwidth part (BWP) or index information of a resource pool.

According to one embodiment of the present disclosure, a non-transitory computer-readable storage medium having instructions thereon may be provided. The instructions, when executed by one or more processors, may cause the one or more processors to obtain configuration information related to a sidelink (SL) positioning reference signal (PRS) by a second apparatus. For example, the configuration information related to the SL PRS may include at least one of information related to a transmission resource set for transmission of the SL PRS or information related to a reception resource set for reception of the SL PRS. For example, the instructions, when executed by one or more processors, may control the one or more processors to transmit control information related to the SL PRS to a first apparatus through an SL PRS control channel (CCH) related to the SL PRS by the second apparatus. For example, the instructions, when executed by one or more processors, may control the one or more processors to transmit the SL PRS to the first apparatus by the second apparatus. For example, the control information related to the SL PRS may include at least one of index information of a bandwidth part (BWP) or index information of a resource pool.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
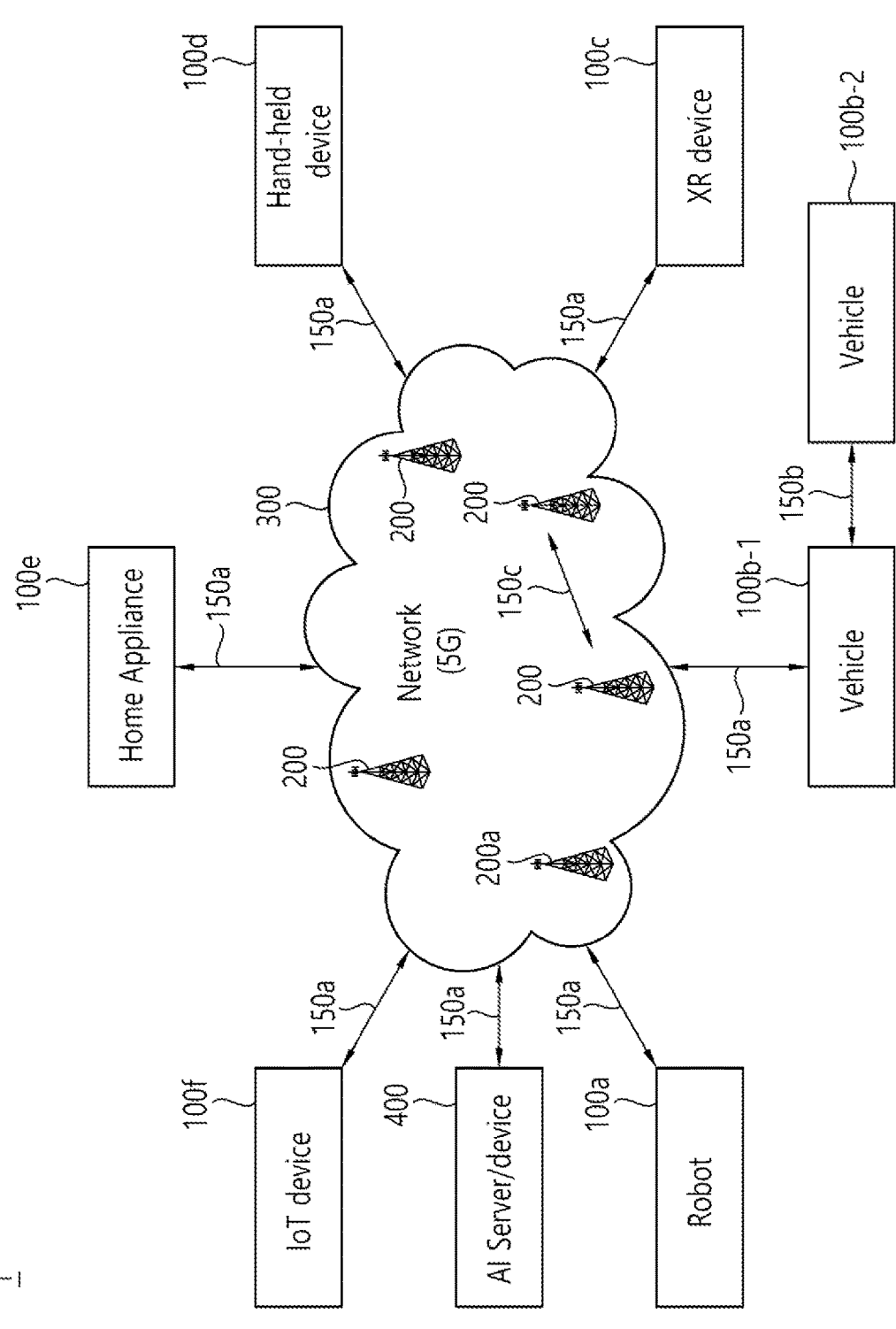
FIG. 19 shows a communication system 1, based on an embodiment of the present disclosure.

FIG. 19 shows a communication system 1, based on an embodiment of the present disclosure. The embodiment of FIG. 19 may be combined with various embodiments of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a B S/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
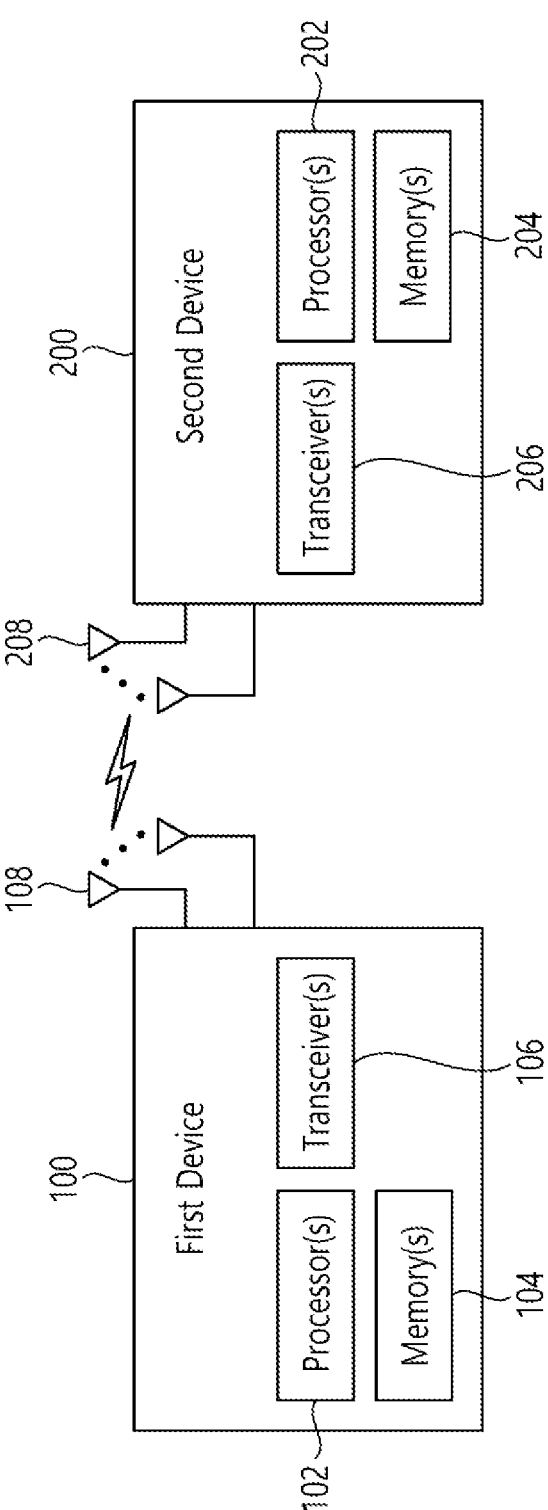
FIG. 20 shows wireless devices, based on an embodiment of the present disclosure.

FIG. 20 shows wireless devices, based on an embodiment of the present disclosure. The embodiment of FIG. 20 may be combined with various embodiments of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
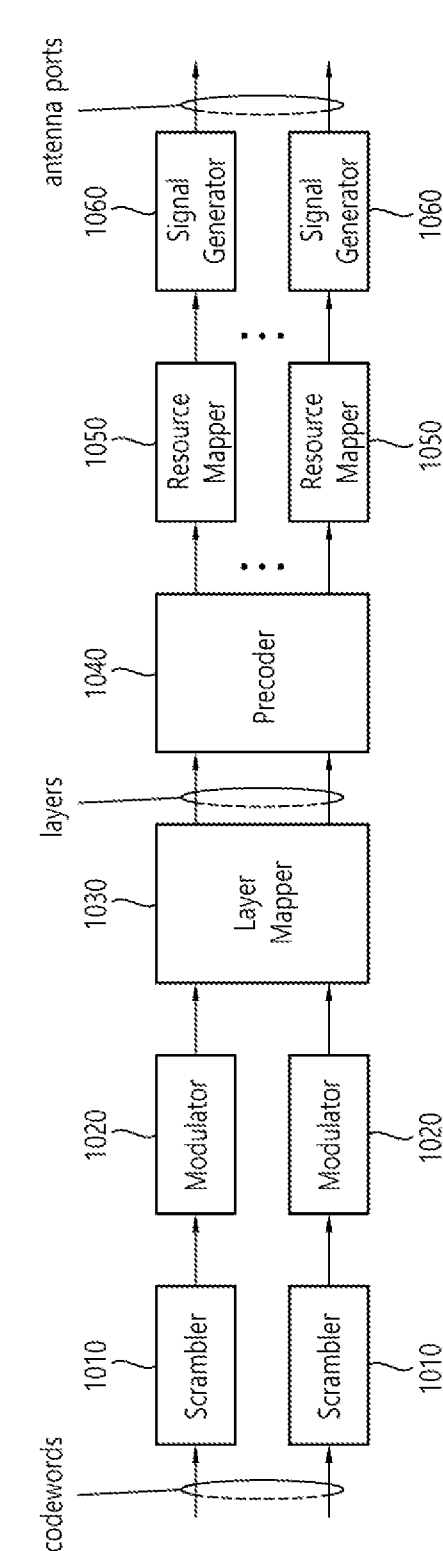
FIG. 21 shows a signal process circuit for a transmission signal, based on an embodiment of the present disclosure.

FIG. 21 shows a signal process circuit for a transmission signal, based on an embodiment of the present disclosure. The embodiment of FIG. 21 may be combined with various embodiments of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BP SK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 22 shows another example of a wireless device, based on an embodiment of the present disclosure. The wireless device may be implemented in various forms according to a use-case/service (refer to FIG. 19). The embodiment of FIG. 22 may be combined with various embodiments of the present disclosure.

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
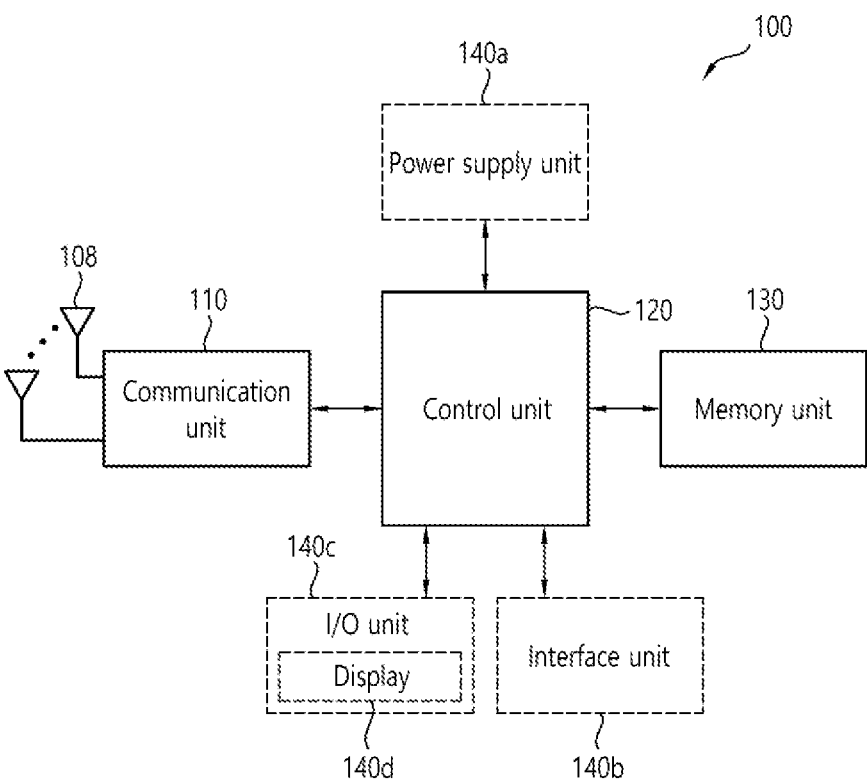
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 23 may be combined with various embodiments of the present disclosure.

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 24 may be combined with various embodiments of the present disclosure.

Referring to FIG. 24, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
   obtaining, by a first device, configuration information related to a sidelink (SL) positioning reference signal (PRS),
   wherein the configuration information related to the SL PRS includes at least one of information related to a transmission resource set for transmission of the SL PRS or information related to a reception resource set for reception of the SL PRS;
   receiving, by the first device from a second device, control information related to the SL PRS through a control channel related to the SL PRS; and
   receiving, by the first device from the second device, the SL PRS based on the control information,
   wherein the control information related to the SL PRS includes at least one of index information of a bandwidth part (BWP) or index information of a resource pool, and
   wherein, based on that a BWP in which the SL PRS is received and a BWP in which the control channel related to the SL PRS is received are a same BWP, the control information related to the SL PRS includes the index information of the same BWP.

2. The method of claim 1, wherein the SL PRS includes an SL PRS for obtaining at least one of information related to a distance between the first device and the second device or information related to a position of the second device.

3. The method of claim 1, wherein the index information of the resource pool includes information representing the resource pool in which the SL PRS is received.

4. The method of claim 1, wherein the index information of the BWP includes information representing the BWP in which the SL PRS is received.

5. The method of claim 1, further comprising:
   switching to the BWP based on that the control information includes the index information of the BWP.

6. The method of claim 1, wherein the control information includes information related to a minimum time gap required for BWP switching.

7. The method of claim 6, wherein the information related to the minimum time gap includes information related to a time gap from a first slot in which the control information is received to a second slot in which the SL PRS is received.

8. The method of claim 7, wherein the time gap is in a unit of a logical slot.

9. The method of claim 1, wherein the control information includes information related to a slot offset in a unit of a logical slot,
   the method further comprising:
   determining a first logical slot after the slot offset from a first time at which the control information is received as a second slot in which the SL PRS is received.

10. The method of claim 1, wherein the transmission resource set or the reception resource set includes at least one symbol for transmission/reception switching between a transmission resource for the PRS transmission and a reception resource for the PRS reception, the transmission resource for the PRS transmission includes a successive first symbol, the reception resource for the PRS reception includes a successive second symbol, and the at least one symbol is a symbol between the first symbol and the second symbol.

11. The method of claim 1, wherein the configuration information related to the SL PRS further includes information for configuring a symbol set for SL communication and a symbol set for the SL PRS not to overlap each other within a single slot.

12. The method of claim 1, wherein the configuration information related to the SL PRS further includes information for configuring a frequency resource set for SL communication and a frequency resource set for the SL PRS not to overlap each other within a single slot.

13. A first device comprising:

at least one transceiver;

at least one processor; and at least one memory connected to the at least one processor and storing instructions that, based on being executed by the at least one processor, cause the first device to perform operations comprising:

obtaining configuration information related to a sidelink (SL) positioning reference signal (PRS), wherein the configuration information related to the SL PRS includes at least one of information related to a transmission resource set for transmission of the SL PRS or information related to a reception resource set for reception of the SL PRS;

receiving, from a second device, control information related to the SL PRS through a control channel related to the SL PRS; and receiving, from the second device, the SL PRS based on the control information, wherein the control information related to the SL PRS includes at least one of index information of a bandwidth part (BWP) or index information of a resource pool, and wherein, based on that a BWP in which the SL PRS is received and a BWP in which the control channel related to the SL PRS is received are a same BWP, the control information related to the SL PRS includes the index information of the same BWP.

14. A processing device comprising:

at least one processor; and at least one memory connected to the at least one processor and storing instructions that, based on being executed by the at least one processor, cause a first device to perform operations comprising:

obtaining configuration information related to a sidelink (SL) positioning reference signal (PRS), wherein the configuration information related to the SL PRS includes at least one of information related to a transmission resource set for transmission of the SL PRS or information related to a reception resource set for reception of the SL PRS;

receiving, from a second device, control information related to the SL PRS through a control channel related to the SL PRS; and receiving, from the second device, the SL PRS based on the control information, wherein the control information related to the SL PRS includes at least one of index information of a bandwidth part (BWP) or index information of a resource pool, and wherein, based on that a BWP in which the SL PRS is received and a BWP in which the control channel related to the SL PRS is received are a same BWP, the control information related to the SL PRS includes the index information of the same BWP.

15. The first device of claim 13, wherein the SL PRS includes an SL PRS for obtaining at least one of information related to a distance between the first device and the second device or information related to a position of the second device.

16. The first device of claim 13, wherein the index information of the resource pool includes information representing the resource pool in which the SL PRS is received.

17. The first device of claim 13, wherein the index information of the BWP includes information representing the BWP in which the SL PRS is received.

18. The first device of claim 13, further comprising:

switching to the BWP based on that the control information includes the index information of the BWP.

*  *  *  *  *